(12) United States Patent
Ording et al.

(10) Patent No.: US 7,698,967 B2
(45) Date of Patent: Apr. 20, 2010

(54) BICYCLE HANDLEBAR WITH REMOVABLE AND ADJUSTABLE AEROBAR

(75) Inventors: Andrew Ording, Carmel, IN (US); Joshua R. Poertner, Brentwood, TN (US)

(73) Assignee: Compositech, Inc., Speedway, IN (US)

( * ) Notice: Subject to any disclaimer, the term of this patent is extended or adjusted under 35 U.S.C. 154(b) by 206 days.

(21) Appl. No.: 11/259,500

(22) Filed: Oct. 26, 2005

(65) Prior Publication Data

US 2006/0090589 A1 May 4, 2006

Related U.S. Application Data

(60) Provisional application No. 60/623,163, filed on Oct. 29, 2004.

(51) Int. Cl.
*B62K 21/12* (2006.01)

(52) U.S. Cl. .................................... 74/551.8; 74/551.1

(58) Field of Classification Search ................ 74/551.8, 74/551.1; 280/276, 279; 403/191, 177, 196, 403/234, 235, 236

See application file for complete search history.

(56) References Cited

U.S. PATENT DOCUMENTS

| | | | |
|---|---|---|---|
| 511,479 A * | 12/1893 | Westbrook | .................. 74/551.4 |
| 575,936 A | 1/1897 | Roso | |
| 1,595,557 A | 8/1926 | Mamiya | |
| D239,011 S | 3/1976 | Hasmasaka | |
| D263,293 S | 3/1982 | Janson | |
| 4,445,396 A | 5/1984 | Shimano | |
| 4,462,267 A | 7/1984 | Shimano | |
| D289,630 S | 5/1987 | Owens | |
| 4,750,754 A | 6/1988 | Lennon | |
| D301,027 S | 5/1989 | Borromeo | |
| 4,829,847 A | 5/1989 | Modolo | |
| 4,862,762 A | 9/1989 | Ross | |
| 4,873,886 A | 10/1989 | Renner | |

(Continued)

FOREIGN PATENT DOCUMENTS

DE 101297 9/1922

(Continued)

*Primary Examiner*—Richard W L Ridley
*Assistant Examiner*—Matthew A Johnson
(74) *Attorney, Agent, or Firm*—Milan Milosevic; Lisa Serdynski

(57) ABSTRACT

A handlebar for a bicycle has first and second laterally extending portions disposed outboard of a central attachment portion. Each of the first and second laterally extending portions is preferably winged-like in configuration to provide reduced air resistance. The first laterally extending portion includes an aerobar clamping mechanism, and the second laterally extending portion includes a second aerobar clamping mechanism. Each aerobar clamping mechanism includes a tapered receiving sleeve having an axis that is generally parallel to a travel axis of the handlebar. A collect having a major axis that extends in a plane generally parallel to the direction of travel of the bicycle is receivable within the receiving sleeve. The collet includes a plurality of axially extending slots that permits the diameter of the collet to be varied. The collet includes an aerobar receiving slot having a major axis that is generally co-linear with the axis of the collet, and is provided for receiving an aerobar. An axial mover member can be coupled to the collet, for axially moving the collet within the aerobar receiving sleeve. Axial movement of the collet within the aerobar receiving sleeve serves to tighten and increase the grip of the collet upon the aerobar.

23 Claims, 14 Drawing Sheets

U.S. PATENT DOCUMENTS

| | | | |
|---|---|---|---|
| 4,878,397 A | 11/1989 | Lennon | |
| 4,903,542 A | 2/1990 | Borromeo | |
| 4,930,798 A | 6/1990 | Yamazaki et al. | |
| 4,951,525 A | 8/1990 | Borromeo | |
| D315,328 S | 3/1991 | Giard, Jr. | |
| 5,000,469 A | 3/1991 | Smith | |
| 5,024,119 A | 6/1991 | Linden | |
| 5,033,325 A | 7/1991 | Giard, Jr. | |
| 5,064,157 A | 11/1991 | O'Neal | |
| 5,083,476 A | 1/1992 | Borromeo | |
| D323,805 S | 2/1992 | Giard, Jr. | |
| 5,133,224 A | 7/1992 | Prins | |
| 5,138,893 A | 8/1992 | Copeland | |
| 5,145,210 A | 9/1992 | Lennon | |
| 5,154,094 A | 10/1992 | Klieber | |
| 5,154,095 A | 10/1992 | Giard, Jr. | |
| 5,163,339 A | 11/1992 | Giard, Jr. et al. | |
| D332,768 S | 1/1993 | Giard, Jr. | |
| D334,164 S | 3/1993 | Klieber | |
| 5,197,350 A | 3/1993 | Borromeo | |
| 5,199,322 A | 4/1993 | Wu | |
| 5,201,243 A | 4/1993 | Schneider | |
| 5,205,185 A | 4/1993 | Herman | |
| 5,209,508 A | 5/1993 | Lennon | |
| D337,748 S | 7/1993 | Adams | |
| 5,224,396 A | 7/1993 | Lobbezoo et al. | |
| 5,235,872 A | 8/1993 | Giard, Jr. | |
| 5,257,552 A | 11/1993 | Boyer et al. | |
| 5,265,496 A | 11/1993 | Townsend | |
| D342,046 S | 12/1993 | Chen | |
| 5,275,067 A | 1/1994 | Lew | |
| 5,285,696 A | 2/1994 | Taylor | |
| D346,145 S | 4/1994 | Jeshurun et al. | |
| D346,574 S | 5/1994 | Jeshurun et al. | |
| 5,315,895 A | 5/1994 | Kattus et al. | |
| 5,319,994 A | 6/1994 | Miller | |
| 5,319,995 A | 6/1994 | Huang | |
| 5,373,757 A | 12/1994 | Bigall | |
| 5,390,564 A | 2/1995 | Klieber | |
| 5,408,900 A * | 4/1995 | Marui | 74/551.4 |
| 5,503,773 A | 4/1996 | Pearce et al. | |
| 5,517,878 A * | 5/1996 | Klein et al. | 74/551.3 |
| 5,524,506 A | 6/1996 | Terry | |
| 5,557,982 A | 9/1996 | Voss et al. | |
| 5,570,614 A | 11/1996 | Nastrucci | |
| 5,598,744 A | 2/1997 | Chen | |
| 5,603,553 A | 2/1997 | Klieber et al. | |
| 5,660,085 A | 8/1997 | Tamplin | |
| 5,676,021 A | 10/1997 | Campagnolo | |
| 5,758,548 A | 6/1998 | Smith | |
| 5,782,139 A * | 7/1998 | Fraiman | 74/551.1 |
| D396,835 S | 8/1998 | Roddy | |
| 5,832,785 A | 11/1998 | Costahaude et al. | |
| 5,899,117 A * | 5/1999 | Newkirk | 74/551.8 |
| 6,003,405 A | 12/1999 | Giard | |
| 6,035,741 A | 3/2000 | Krizman, Jr. | |
| 6,058,800 A | 5/2000 | Giard | |
| 6,092,438 A | 7/2000 | Soto | |
| 6,098,493 A | 8/2000 | Cortes | |
| 6,234,043 B1 | 5/2001 | Marshall | |
| D449,808 S | 10/2001 | Soto | |
| 6,334,634 B1 * | 1/2002 | Osterkil | 285/322 |
| 6,394,694 B1 | 5/2002 | Klieber | |
| 6,421,879 B1 | 7/2002 | Gratz et al. | |
| 6,467,372 B2 | 10/2002 | Klieber | |
| 6,546,827 B2 | 4/2003 | Irie | |
| 6,609,437 B2 | 8/2003 | Jiang | |
| 6,764,246 B1 | 7/2004 | Chiang | |
| 6,923,089 B2 | 8/2005 | Wu | |
| 6,968,926 B2 * | 11/2005 | Matsueda | 188/24.11 |
| 2001/0022115 A1 | 9/2001 | Klieber | |
| 2002/0108465 A1 | 8/2002 | Rocket | |
| 2002/0139220 A1 | 10/2002 | Irie | |
| 2002/0170378 A1 | 11/2002 | Flum et al. | |
| 2003/0094067 A1 | 5/2003 | Whiting et al. | |
| 2003/0150292 A1 | 8/2003 | Duncan | |
| 2003/0188601 A1 | 10/2003 | Maslowsky et al. | |
| 2004/0060382 A1 * | 4/2004 | McColligan et al. | 74/551.8 |

FOREIGN PATENT DOCUMENTS

| | | |
|---|---|---|
| DE | 278827 | 2/1952 |
| DE | WO 91/16231 | 10/1991 |
| FR | 638790 | 6/1928 |

* cited by examiner

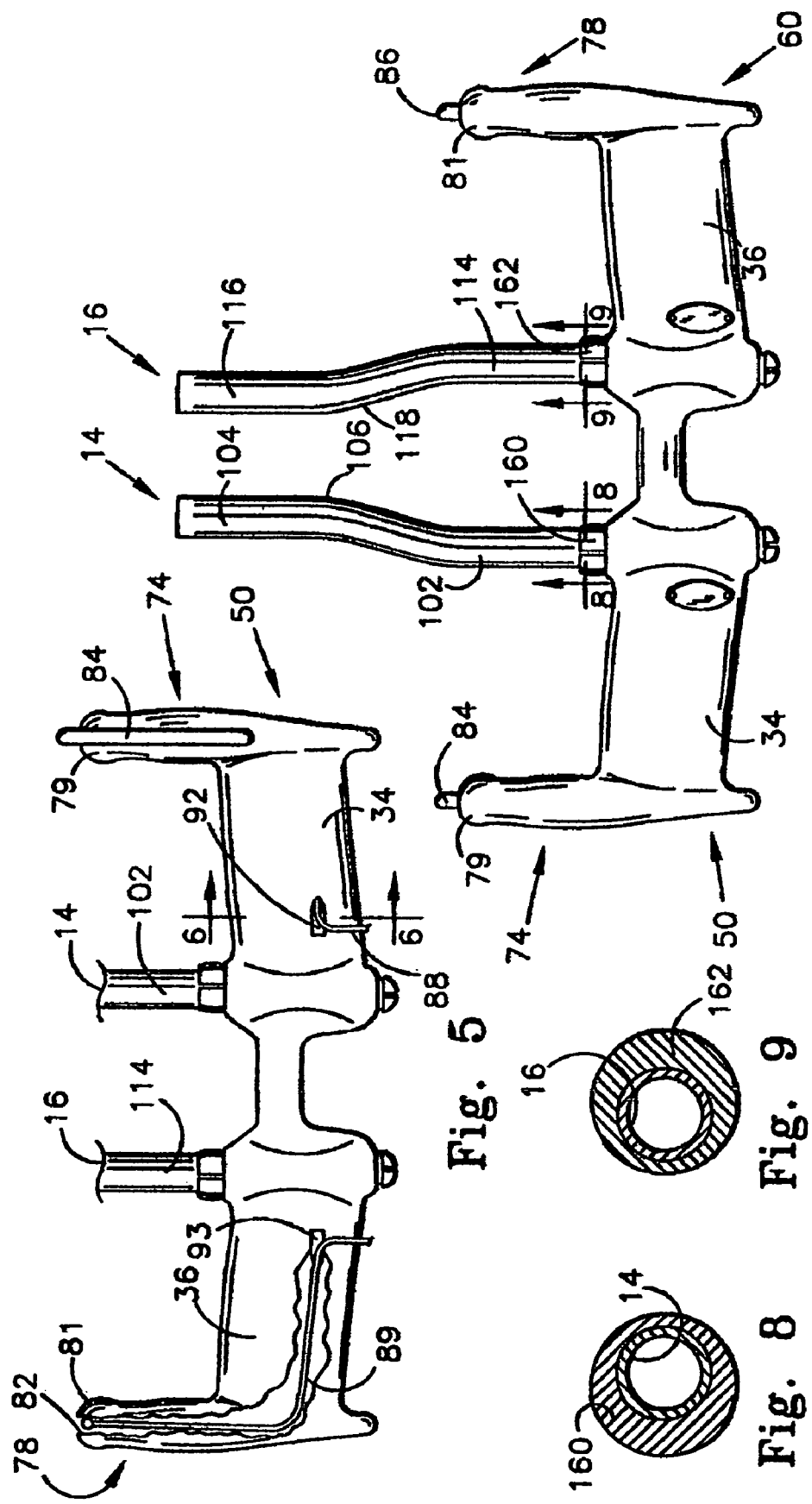

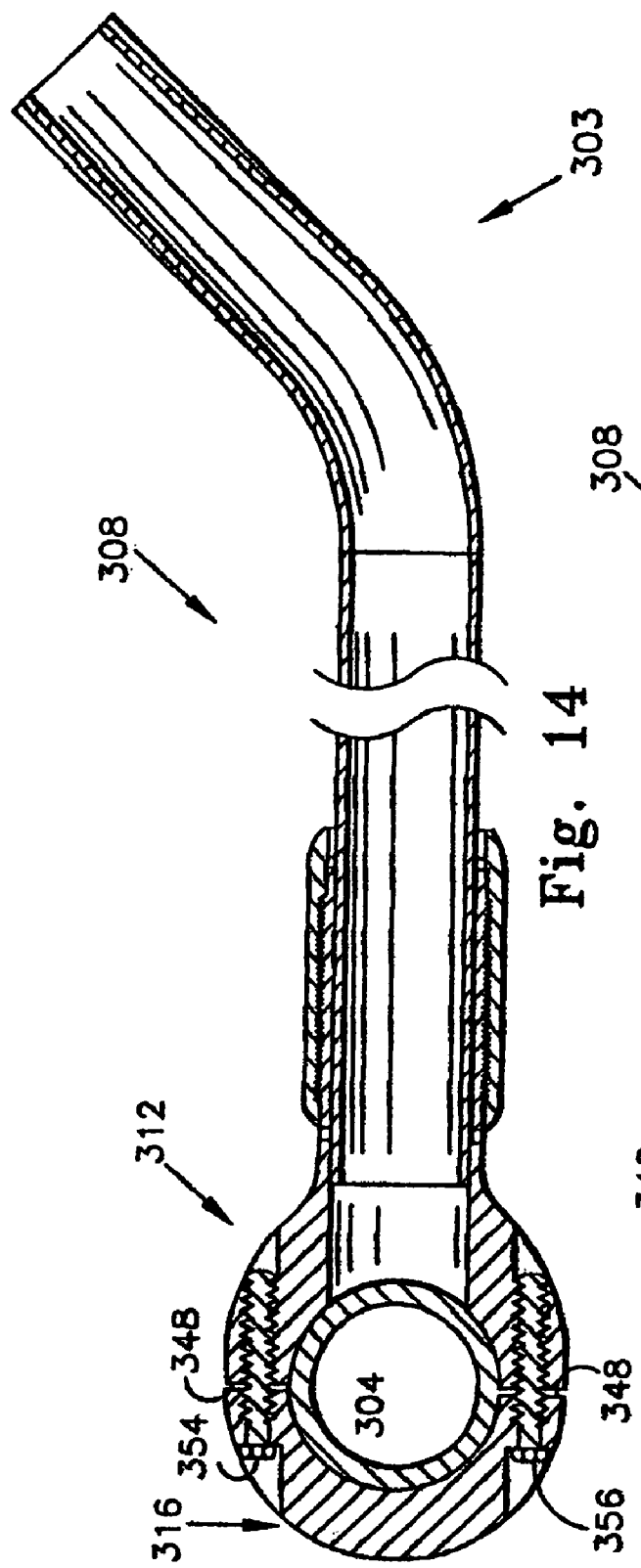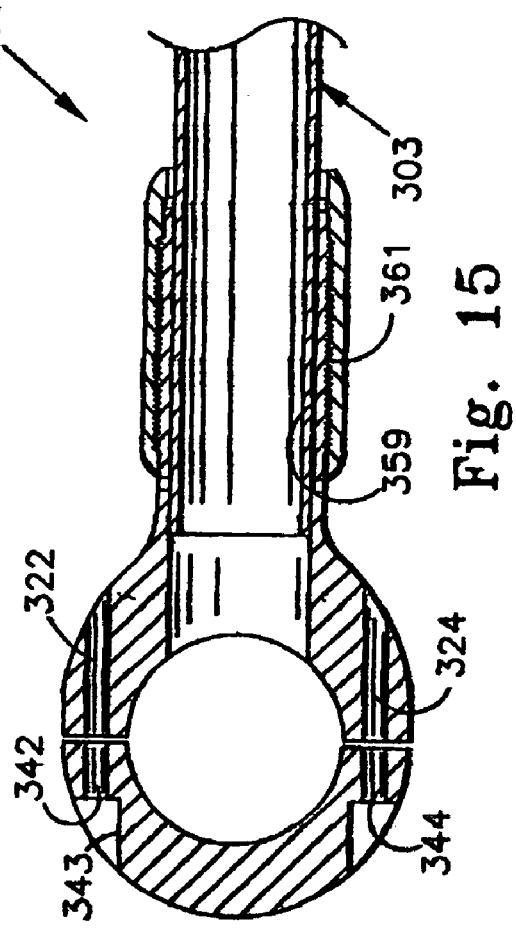
Fig. 14
Fig. 15

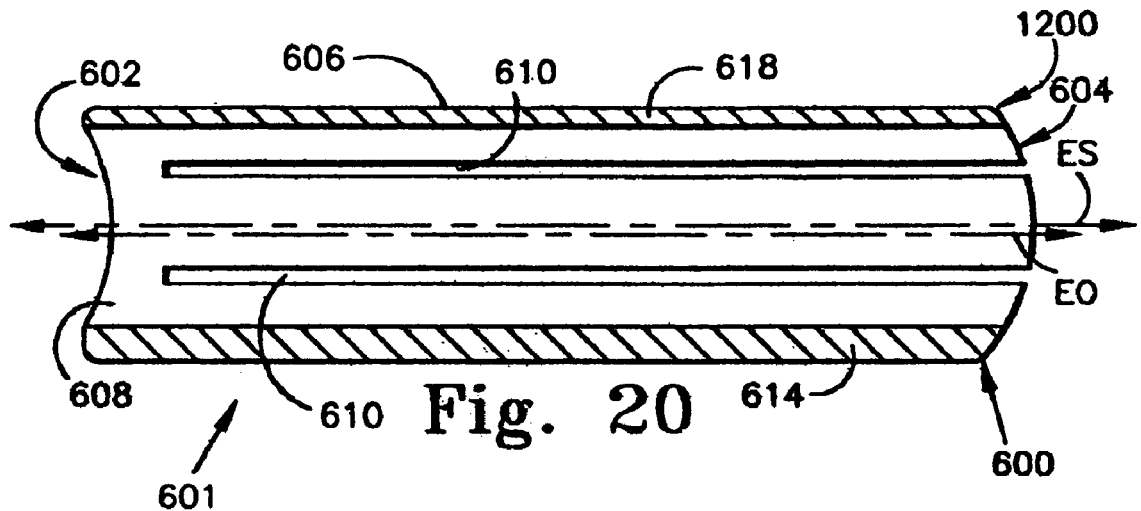
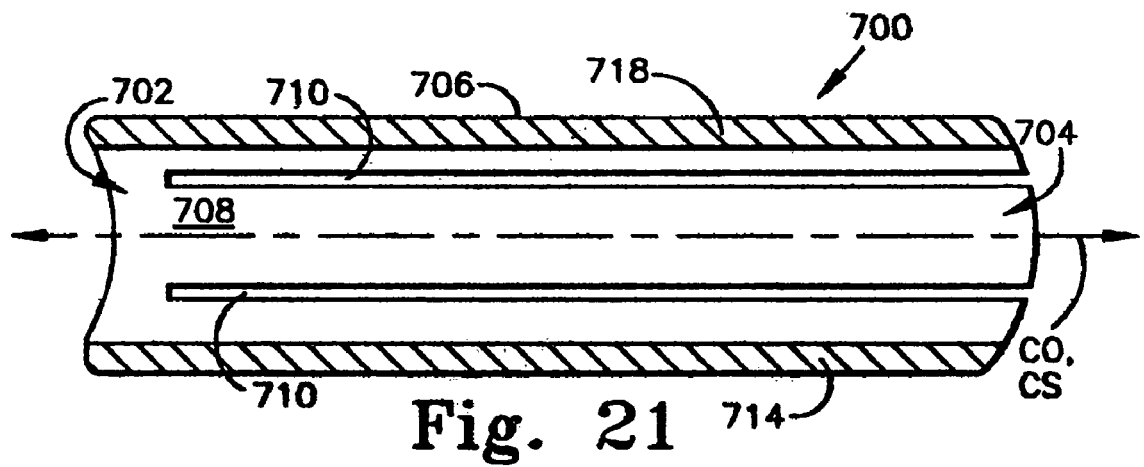
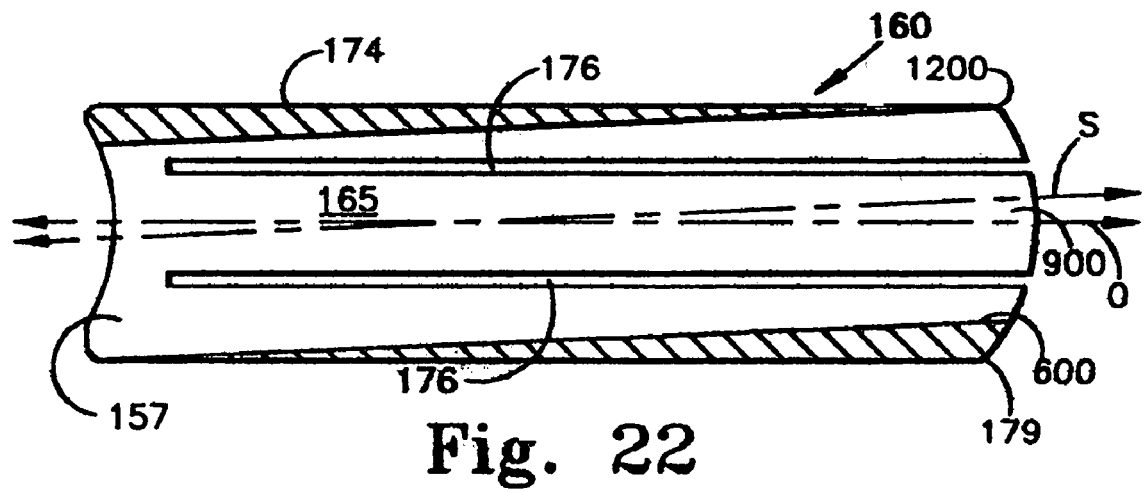

BICYCLE HANDLEBAR WITH REMOVABLE AND ADJUSTABLE AEROBAR

I. PRIORITY CLAIM

The instant application claims priority to Ording and Poertner, U.S. Provisional Patent Application No. 60/623,163 filed 29 Oct. 2004.

II. TECHNICAL FIELD OF THE INVENTION

The present invention relates to components for a human powered vehicle, such as bicycles, and more particularly, to a novel handlebar for use with a human powered vehicle, such as a bicycle.

III. BACKGROUND OF THE INVENTION

Most human powered vehicles, such as bicycles, include a handlebar mechanism to enable the user to steer the vehicle. A handlebar mechanism typically includes a shaft member that extends through the frame, and is coupled to the fork of the bicycle, so that rotational movement of the shaft causes rotational movement of the bicycle wheel. The stem member is connected onto the shaft, and extends upwardly, and, usually forwardly. The stem includes a clamping member, that permits a handlebar to be clamped to the stem.

The handlebars on most bicycles have a major axis that is disposed in a plane generally perpendicular to the direction of travel of the bicycle. A pair of hand grips are disposed at the outboard ends of the handlebars to provide a convenient place for the user to grip the handlebars.

Handlebars come in a variety of shapes, including rams horn-type drop handlebars that are typically found on touring bikes; high rise handlebars of the type that were used in connection with SCHWINN sting-ray bicycles that first appeared in the 1960s; and "generally straight" type handlebars of the type that are found on mountain bikes.

Some handlebars that are used primarily in connection with racing and touring bicycles include aerobars. Examples of aerobars can be seen in many of the Lennon patents.

An aerobar consists of a handlebar segment(s) that have a primary extent in a direction parallel to the direction of travel of the bicycle. The forward most (distal end) of the aerobar typically includes a hand grip portion upon which the user can grip the aerobar. When using an aerobar, the user places his hands on the aerobar, and rests his elbows on the laterally extending member of the handlebar.

When in this position, wherein the user's forearm is on the lateral portion, and his hand grips onto the aerobar, the rider will assume a crouch position wherein the user's back is disposed in a plane that is somewhat parallel to the road surface upon which the bike is traveling. When in this crouch position, the user's body presents less surface area to the wind, thus making this position a relatively aerodynamically favorable position in which to ride a bicycle. This aerodynamically favorable position helps to contribute to the speed achievable by the user, and helps reduce the amount of effort required to propel the bicycle forwardly.

Many handlebars designed for use with aerobars will include a forearm pad that is mounted onto the lateral portion of the handlebar that provides a more comfortable rest for the user's forearm than the often tubular bar-like configuration that is assumed by the laterally extending portion of the handlebar.

Although many different types of aerobars exist, room for improvement exists.

One area where room for improvement exists is providing an aerobar gripping system that permits easy adjustability of the aerobar. As will be appreciated, differences in user body size, and user preference dictates that the aerobar have some adjustability, in order to better fit the user and make the use of the aerobar more comfortable to the user.

Another area wherein room for improvement exists relates to the aerodynamic qualities of the aerobar. Heretofore, most handlebar and aerobar combinations have been tubular in configuration. One object of the present invention is to provide a more aerodynamically efficient handlebar configuration than known tubular handlebars.

Another area wherein room for improvement exists relates to the removability and replaceability of the aerobars from the handlebar. Many previously known aerobars suffer the deficiency of being difficult to install as well as difficult to remove. These difficulties cause problems, as certain circumstances exist wherein a rider prefers to remove the aerobars from his handlebar. Other circumstances exist wherein the user may wish to either change the aerobars on his bicycle without being required to change the entire handlebar, or otherwise provide a significant adjustment to the handlebar.

One object of the present invention is to provide a mechanism for attaching an aerobar to a handlebar that facilitates the quick and easy connection of the aerobar to the handlebar, and the quick and easy removal of the aerobar from the handlebar.

Another object of the present invention is to provide an improved handlebar.

IV. SUMMARY OF THE INVENTION

In accordance with the present invention, a handlebar with a removable and adjustable aerobar is disclosed.

The handlebar includes a central portion that is provided for being attached to a bicycle stem. First and second laterally extending portions are disposed outboard of the central portion. Each of the first and second laterally extending portions is preferably winged-like in configuration to provide a reduced air resistant surface, when compared to some known tubular-type handlebars.

The handlebar of the present invention includes a first axis that extends in a plane generally parallel to the direction of the travel of the bicycle that is referred herein as the "travel axis". Perpendicular to the travel axis is a second axis that is referred herein as the "lateral axis". The lateral axis is disposed in a plane that is generally perpendicular to the direction of travel of the bicycle.

The first laterally extending member includes an aerobar clamping mechanism, and the second laterally extending member includes a second aerobar clamping mechanism. Each of the aerobar clamping mechanisms includes a tapered receiving sleeve having an axis that is generally parallel to the travel axis of the handlebar. A collet having a major axis that extends in a plane generally parallel to the direction of travel of the bicycle is receivable within the receiving sleeve. The collet includes a plurality of axially extending slots that permits the diameter of the collet to be varied. Each of the collets include an aerobar receiving slot, having a major axis that is generally co-linear with, or slightly offset from, or parallel to the axis of the collet, and is provided for receiving an aerobar member. An axial mover member can be coupled to the collet, for axially moving the collet within the aerobar receiving sleeve. Axial movement of the collet within the aerobar receiving sleeve serves to tighten and increase the grip of the collet upon the aerobar.

Preferably, the axis of the collet is offset by about three degrees from the axis of the aerobar receiving sleeve. This axial offset promotes an enhanced adjustability of the aerobars as it allows the aerobars to be adjusted to tilt upwardly, downwardly, inwardly or outwardly. Because of the nature of the collet, these adjustments can be made over a 360 degree range of various adjustments. Particularly, rotational orientation of the collet within the tapered receiving sleeve of the aerobar changes the axial position of the collet axis relative to the aerobar axis to provide the various adjustments. In one form, the handlebar includes a collet receiver for disposing the collet along a first axis, and wherein the collet is capable of receiving an aerobar such that the aerobar is disposed along a second axis offset from the first axis.

One feature of the present invention is that the aerobar attachment mechanism can be used in connection with aerobar clamps that are built into the handlebar as a part of the handlebar; and that can also adapted to retrofit on existing handlebars.

Another feature of the present invention is that the handlebar of the present invention provides a reduced-drag handlebar that is believed by the Applicants to have enhanced aerodynamic properties when compared to traditional tube-type handlebars.

A further feature of the present invention is that the clamping mechanism permits the aerobars to be easily removed and attached to the aerobar clamping mechanisms.

A further feature of the present invention is that the clamping mechanism provides for a wide variety of adjustments of the aerobars.

One facet of the adjustment enables the aerobars to be rotated, about their long axis, so that their handgrip portions can be rotated into a position that the user finds most comfortable. Another facet of the adjustability of the aerobars of the present invention, is that the forwardly extending segment of the aerobars can be adjusted about 360 degree axis so that, for example, the aerobars can be titled upwardly, downwardly, inwardly (with respect to the primary travel axis of the bicycle), and outwardly. Further, the 360 degree adjustability of the device permits the aerobars to be adjusted, for example, upwardly and inwardly, upwardly and outwardly, downwardly and outwardly, and downwardly and inwardly, among other adjustments.

Also, the clamping mechanism of the present invention enables the effective length of the aerobars to be adjusted, so that they can, for example, accommodate users having different lengths of forearms.

These and other features of the present invention will become apparent to those skilled in the art, upon review of the detailed description and drawings of the embodiments of the invention that are perceived by the Applicants, at the present time, to represent the best mode of practicing the invention.

V. BRIEF DESCRIPTION OF DRAWINGS

FIG. 5 is a bottom view of the handlebar of FIG. 1;

FIG. 7 is a top view of the handlebar of FIG. 1;

FIG. 8 is a sectional view of one of the aerobar clamping mechanisms of the handlebar of FIG. 7 taken along line 8-8 thereof;

FIG. 9 is a sectional view of the other of the aerobar clamping mechanisms of the handlebar of FIG. 7 taken along line 9-9 thereof;

FIG. 10 is an enlarged, sectional view of an exploded aerobar clamping mechanism of the present invention taken along line 10-10 of FIG. 3a;

FIG. 14 is a sectional view of the clamping mechanism of the aerobar of the present invention taken along line 14-14 of FIG. 12;

FIG. 15 is an enlarged, sectional view of the clamping mechanism of the aerobar of the present invention;

FIG. 20 is an enlarged side sectional view of a first alternate embodiment "eccentric" collet useable with the handlebar of the present invention shown in FIG. 1;

FIG. 21 is an enlarged side sectional view of a second alternate embodiment "colinear" collet useable with the handlebar of the present invention shown in FIG. 1; and FIG. 22 is an enlarged side sectional view of the primary embodiment "bi-axial" collet shown in FIGS. 1-11.

VI. DETAILED DESCRIPTION

Figure 1:
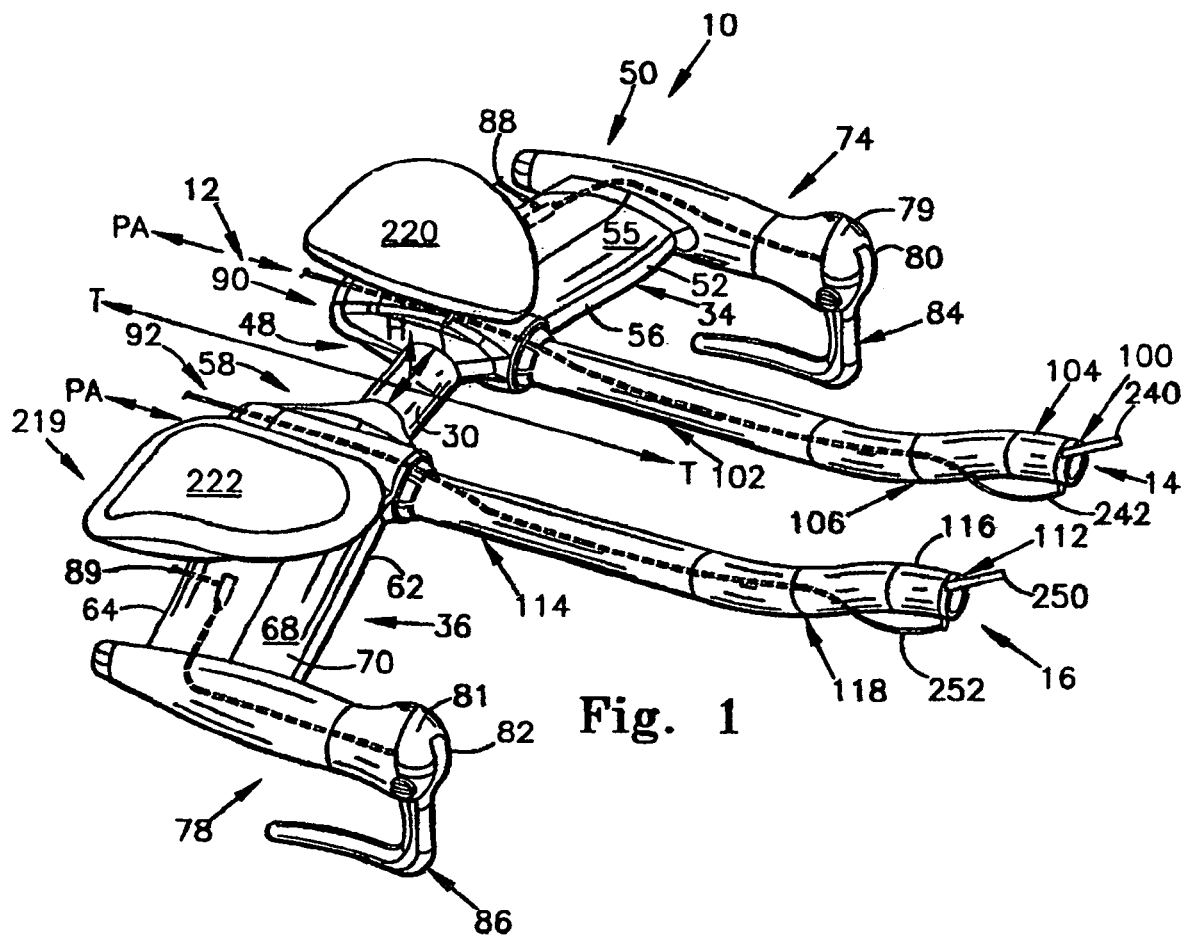
FIG. 1 is a perspective view of an exemplary embodiment of a handlebar with removable and adjustable aerobars according to the principles of the present invention.

A handlebar system 10 of the present invention, is shown in FIGS. 1-11, that is capable of being attached to a bicycle, or other similar vehicle, of the type that requires a handlebar-like device either for use as a steering device, or otherwise, as a device for being gripped by a user for one purpose or another.

The handlebar system 10 includes two primary components, a handlebar 12, and aerobars that are shown in the drawings as including a first aerobar 14 and a second aerobar 16.

As depicted in FIG. 1, three axes are shown, including travel axis T, handlebar axis H, and vertical axis V. It should be understood that the names described to these particular axes are for purposes of reference for the instant description, and are not to be considered to be limitations. For example, the vertical axis may not be disposed vertically if, for example, the handlebar could be positioned on a bicycle at a 90 degree angle to the angle of disposition suggested by FIG. 1.

The travel axis T was so named, because it tends to indicate an axis that is generally parallel to the line along which a vehicle to which the handlebar system 10 is attached travels.

Handlebar axis H, is so named because it comprises the major axis of the handlebar 12, as it will be noted that the length of the handlebar along axis H is substantially greater than its length along either axis T or V. Axis V is referred to as the vertical angle, as axis V would normally extend vertically of the handlebar system 10 is attached to a bicycle in orientation similar to that shown in FIG. 1.

Each of axes T, H and V, are perpendicular to each other, and as such, could also be thought of as "X, Y, Z" axes, to help provide a better reference to coordinates, that relate to relative directions and positions of the various components of the handlebar system 10.

The handlebar system and its various components may be made out of any one or a combination of a variety of materials. However, the handlebar system 10 with its various components are preferably primarily comprised of a fiber reinforced plastic material, such as carbon fiber-type material. The Applicants have found, after having produced such fiber reinforced plastic components for more than a decade, that such fiber reinforced plastic materials, when used in connection with bicycle components, provide bicycle components that are both very strong and very light weight. Strength and light weight are prized attributes of bicycle components in general, and especially bicycle components that are being used by competitors. In this regard, for example, many high-level competitors at events, such as the Iron Man Triathlon, and the Tour de France ride bicycles with several fiber reinforced plastic components, such as wheels, handlebars, hubs, cranks and the like.

One benefit of the use of such fiber reinforced plastic is that they enable the manufacture to produce very lightweight products that have relatively large volumes and large surface area shapes that have highly desirable aerodynamic properties.

As best shown in FIGS. 1, 2, 3, 3a and 4, the handlebar 12 of the system 10 includes a center section 30 that is sized and configured for being received by a clamp of a stem of a bicycle (both of which are not shown) or clamp of such other vehicles to which the handlebar system may be attached. In the drawings, the center 30 is shown as being generally tube-like in configuration, and may possess any one of a variety of cross sectional shapes. For aerodynamic and fit purposes, the center section 30 preferably has either a cylindrical, ovaloid or elliptical cross section, when such cross section is made in a plane that contains both the travel axis and vertical axis.

A first laterally extending portion 34 is disposed outboard of the center section 30, and a second laterally extending portion 36 is disposed outboard of the center section 30 on an opposite side of the center section 30. The first laterally extending portion 34 includes a proximal end portion 48 disposed adjacent to the center section 30, a distal end portion 50, a leading edge portion 52, and a trailing edge portion 54. The first laterally extending portion 34 also includes an upper surface 55 and a lower surface 56 (see e.g. FIG. 2).

Figure 3:
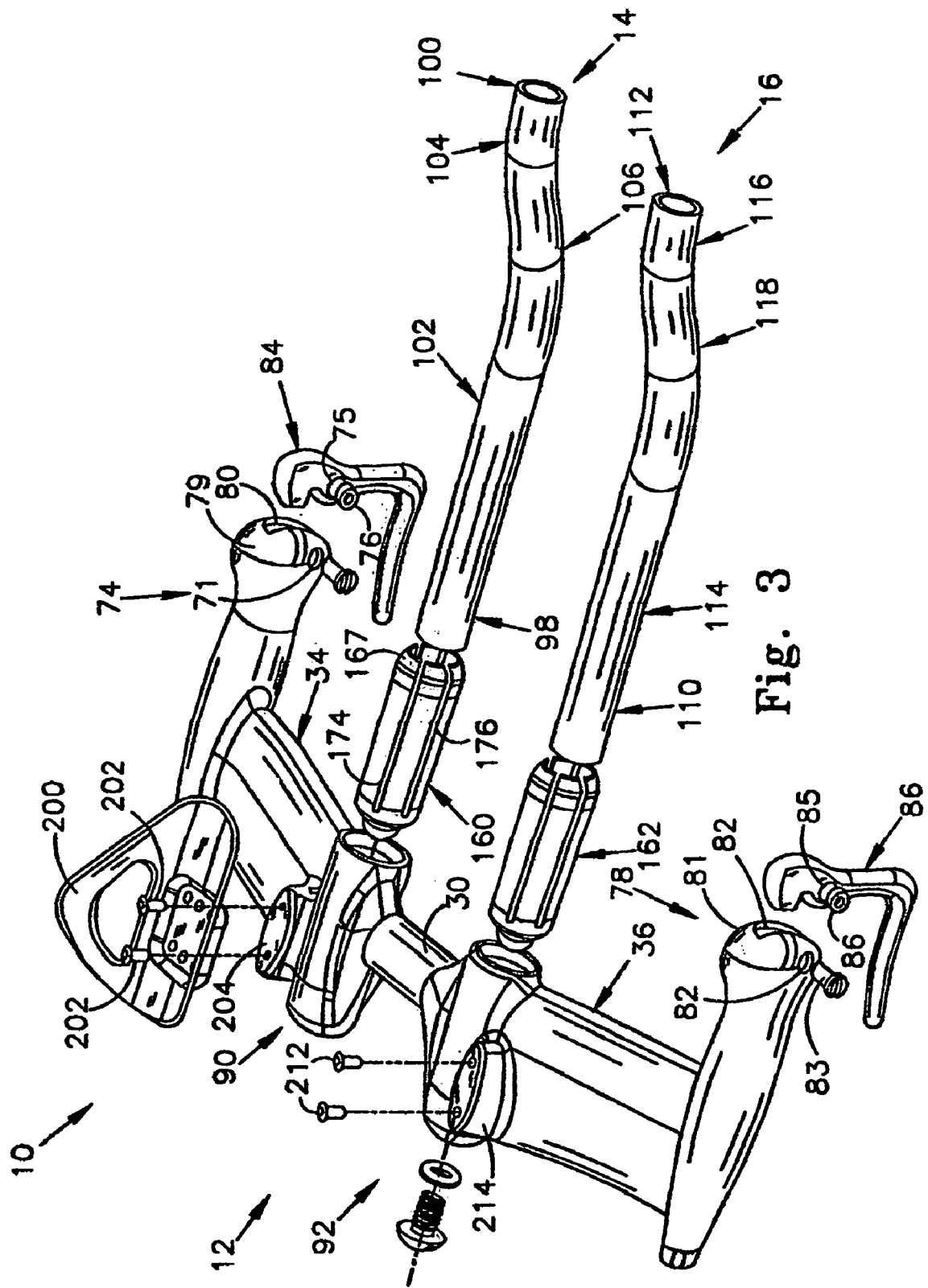
FIG. 3 is an exploded perspective view of the handlebar of FIG. 1 illustrating the components thereof, one forearm rest not shown for clarity.
Figure 3A:
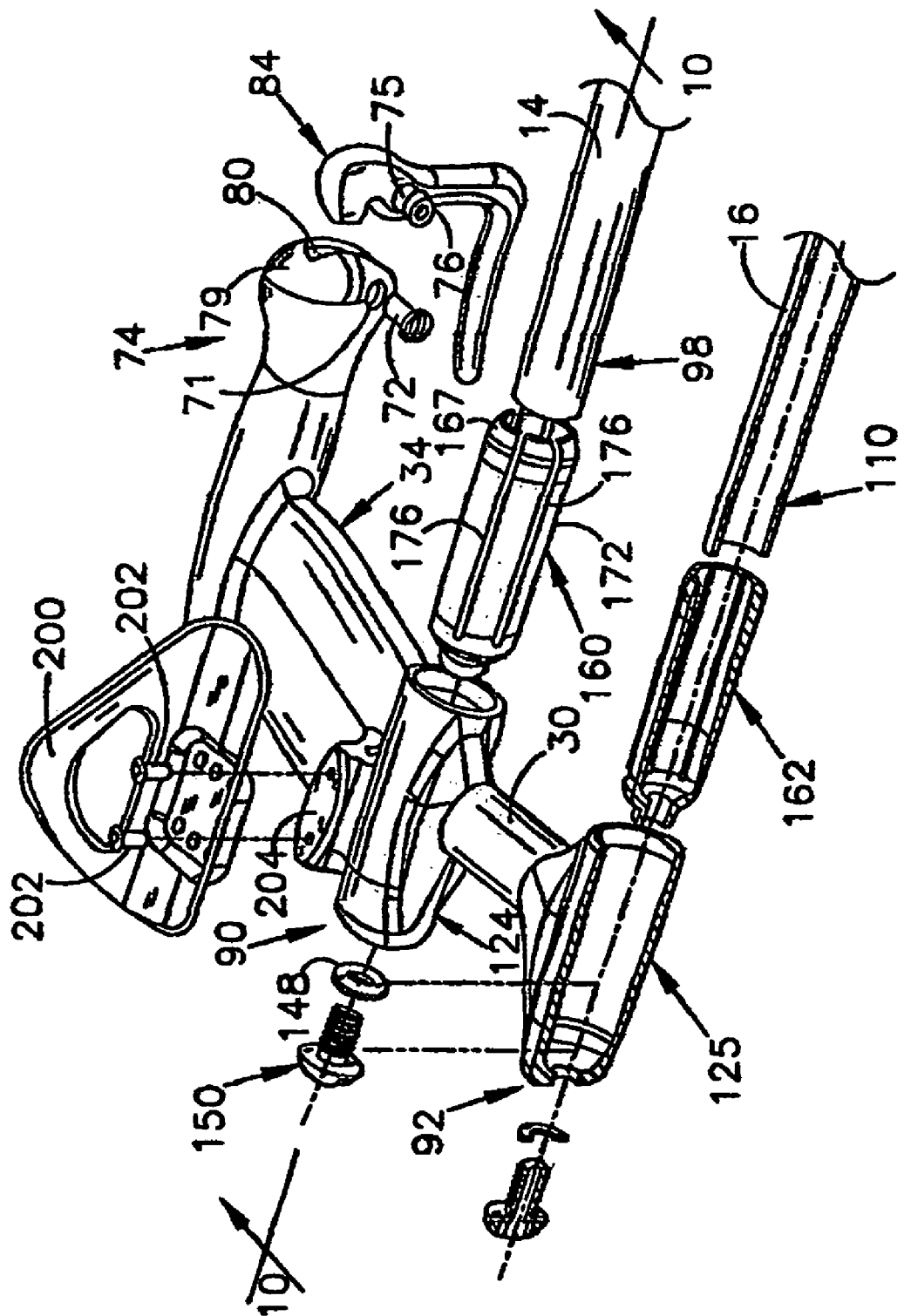
FIG. 3A is a perspective view of a portion of the handlebar of FIG. 3 with one of the aerobar attachment mechanisms in section.
Figure 4:
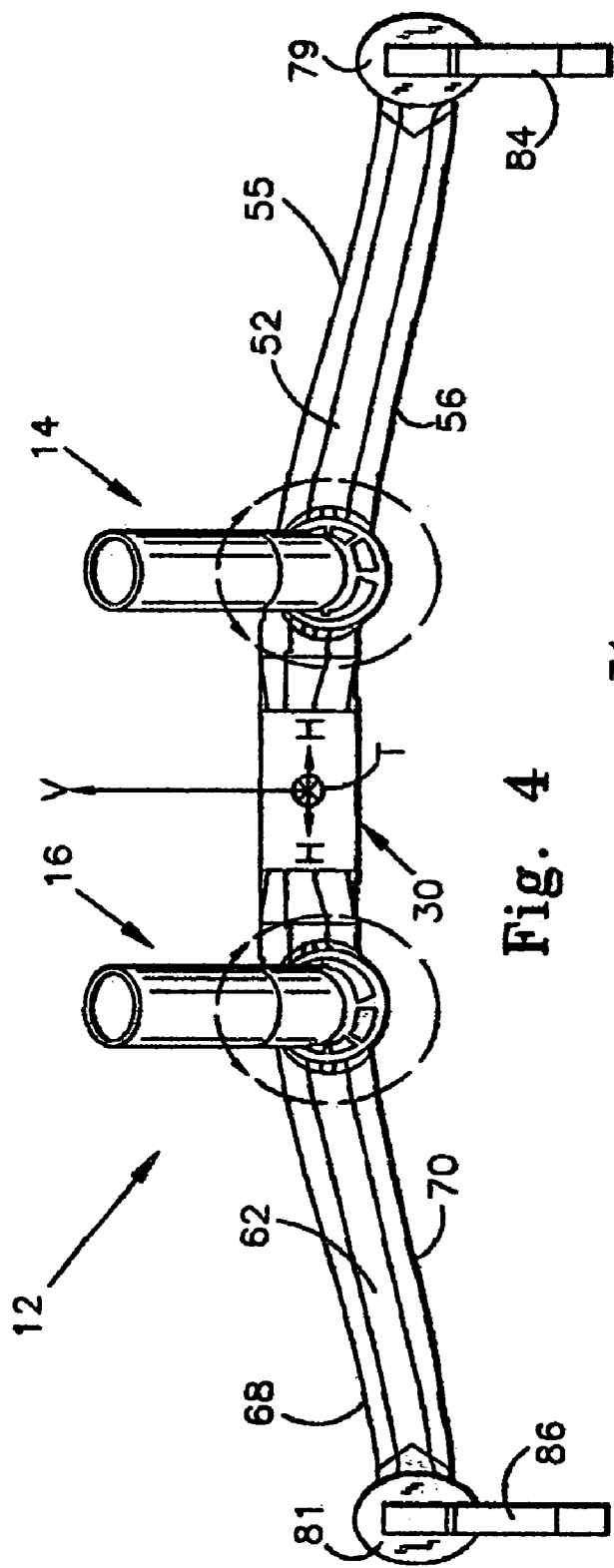
FIG. 4 is a front view of the handlebar of FIG. 1.

Similarly, the second laterally extending portion 36 includes a proximal portion 58, a distal portion 60, a leading edge portion 62, a trailing edge portion 64, and an upper surface 68 and a lower surface 70 (see e.g. FIG. 3).

To improve aerodynamic efficiency the first and second laterally extending portions 34, 36 are generally winged-shaped, having smooth leading edges, upper and lower surfaces, and trailing edges. The winged-shaped configurations help to reduce air resistance as the handlebar moves through the air during the riding of a bicycle. As will be familiar to those involved with airplanes and race cars, wings can be designed to impart lift (in the case of an airplane), down force (in the case of a race car), or to remain neutral. It has been found by Applicants that the wing configuration should preferably be designed to be neutral, providing neither down force nor lift.

A first hand grip portion 74 is disposed at the distal end portion 50 of the first laterally extending portion 34 of the handlebar, and a second hand grip portion 78 is disposed at the distal end portion 50 of the second laterally extending portion 36. Each of the first and second hand grip portions are designed to provide a suitable gripping surface for the user riding the bicycle, while being designed to do so in a configuration that helps to reduce aerodynamic drag, and promotes smooth air flow across the surfaces of the hand grip portion. Each of the first and second hand grip portions 74, 78 include a rounded first end 79, 81, respectively, each first end of which includes a slot 80, 82. The slots 80, 82 are provided for receiving hand brake levers 84, 86. The hand brake levers 84, 86 are pivotally connected to the first and second hand grip portions 74, 78, for permitting the user to actuate the brakes of the bicycle.

The manner in which the hand brake levers are pivotally coupled to the hand grip portions is now described with particular reference to FIG. 3. The hand brake lever 84 has a head that is received in the slot 80 of the first end 79 of the hand grip portion 74 and includes a bore 75 that is situated to coaxially align with bore 71 of the first end 79. A grommet or the like 76 may be provided in the bore 75 while a pivot pin 72 extends through the grommet and bores 71, 75. In this manner, the hand brake lever 84 pivots about the pivot pin 72. In like manner, the hand brake lever 86 has a head that is received in the slot 82 of the first end 81 of the hand grip portion 78 and includes a bore 85 that is situated to coaxially align with bore 82 of the first end 81. A grommet or the like 86 may be provided in the bore 85 while a pivot pin 83 extends through the grommet and bores 82, 85. In this manner, the hand brake lever 86 pivots about the pivot pin 83.

The hand brake lever 84 is connected to a brake cable 88 (see e.g. FIGS. 1 and 2) while hand brake lever 86 is connected to a brake cable 89. The brake cables 88 and 89 are connected to front and rear (or vice versa) brake actuators (not shown) of the vehicle (e.g. bicycle).

Figure 6:
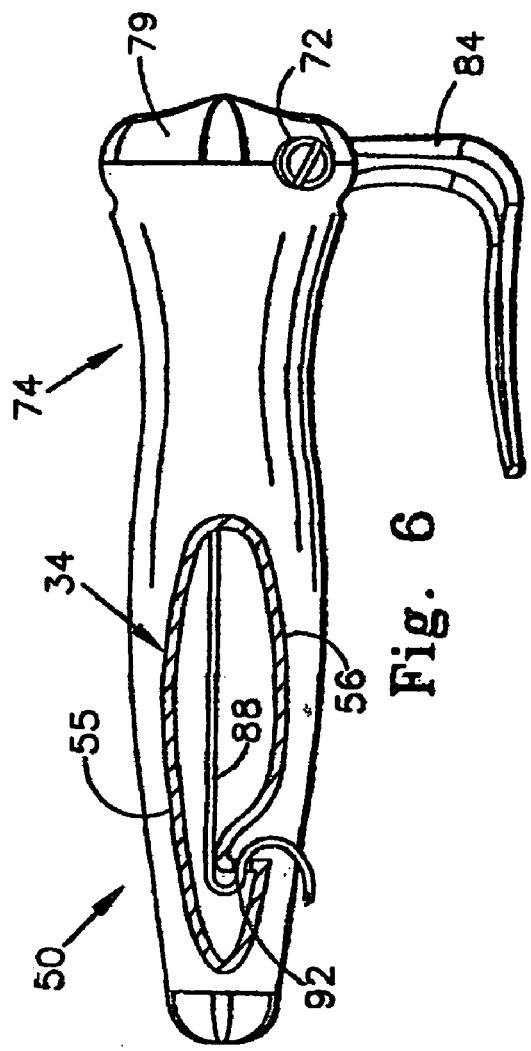
FIG. 6 is a sectional view of a lateral portion of the handlebar of FIG. 5 taken along line 6-6 thereof.
Figure 10:
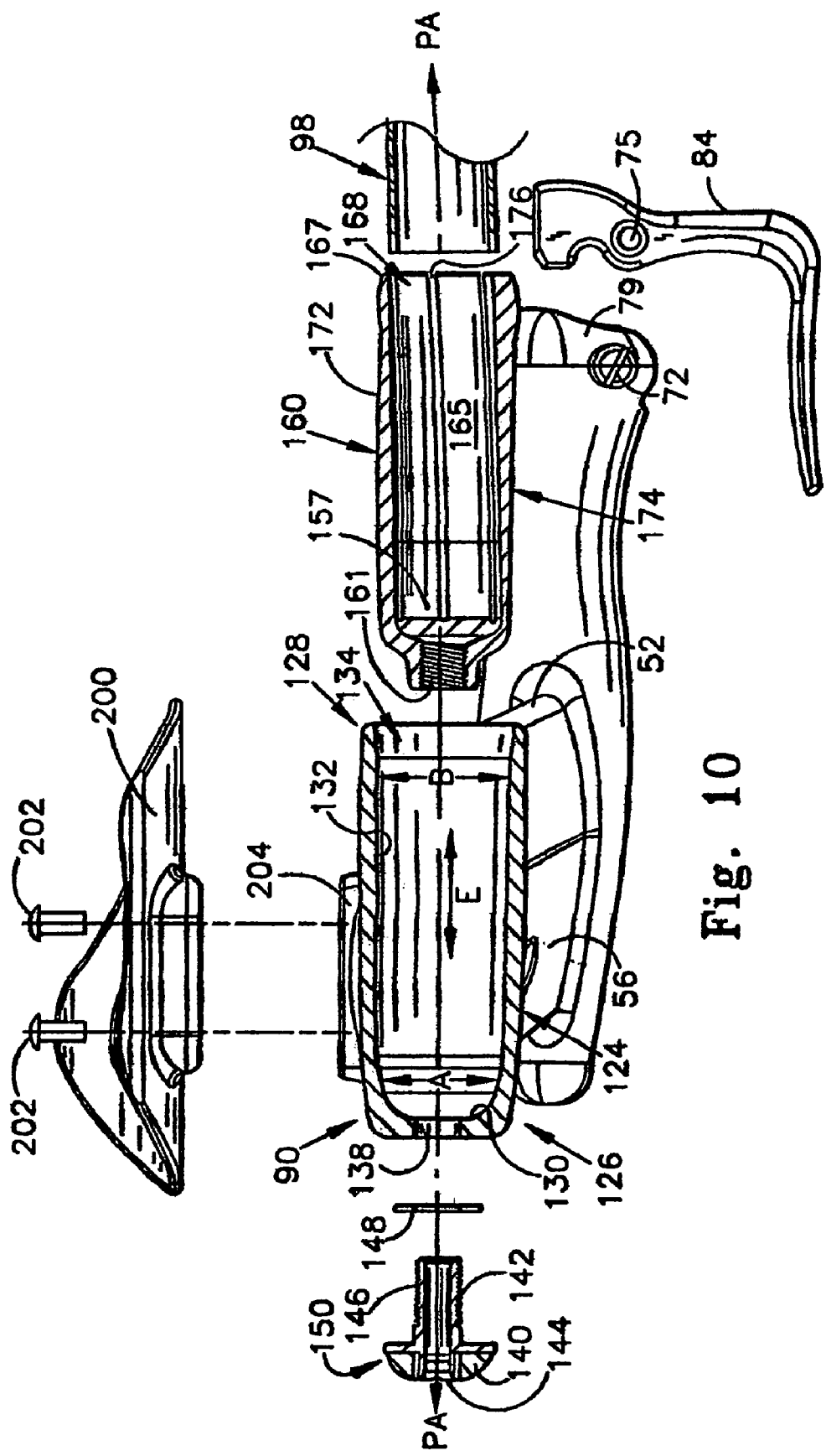
Figure 11:
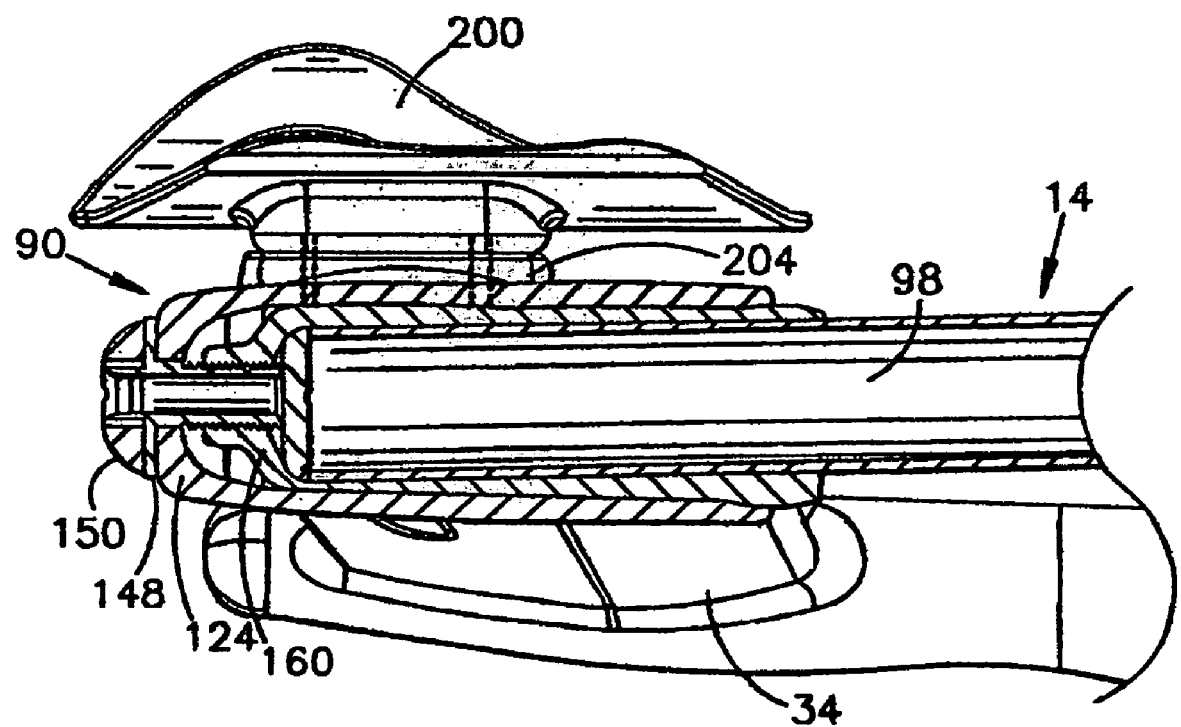
FIG. 11 is an enlarged, sectional view of an assembled aerobar clamping mechanism of the present invention.

Referring additionally to FIGS. 5 and 6, the brake cable 88 is coupled to hand brake lever 84, and extends generally axially through the hand grip portion 74, axially through the distal end portion 50 of the laterally extending portion 34 and emerges from a slot 92 on the underside 56 of the laterally extending portion 34. Similarly, brake cable 89 is coupled to hand brake lever 86 and extends generally axially through the hand grip portion 78, axially through the distal end portion 60 of the laterally extending portion 36 and emerges from a slot 93 on the underside 70 of the laterally extending portion 36. Thereafter, both brake cables 88, 89 are routed as known in the art.

Referring back to FIGS. 1, 2, 3, 3a and 4, a first aerobar receiving clamp 90 is also disposed on the laterally extending portion 34, and a second aerobar clamp 92 is also disposed on the second laterally extending portion 36. The aerobar receiving clamps 90, 92 generally have a primary axis PA (see e.g., FIGS. 1 and 10) that is generally parallel to the travel axis T, but may be offset from travel axis T, depending upon the pitch of the handlebar. The first aerobar clamp 90 includes a front end 91, and a rear end 93. The second aerobar receiving clamp 92 includes a front end 94 and a rear end 96.

The aerobar receiving clamps 90, 92 have generally hollow interiors, as will be described in more detail below, and are provided for clamping the aerobars 14, 16 respectively onto the handlebar 12.

The first aerobar 14 is generally hollow and tubular in nature, and may be comprised of either a metal material such as steel or aluminum, or alternately, a carbon fiber material.

The preferred material from which the aerobar 14 is made is carbon fiber, that, because of its strength and light weight, the Applicants have found to be especially advantageous, and desired by competitive riders such as racers and triatheletes. Those who are most cost and less performance conscious, may choose to use either light metal aerobars 14, 16 (e.g. titanium, aluminum) or even bars made of steel.

The first aerobar 14 includes a first or proximal end 98, a second or distal end 100, an extension portion 102, a handgrip portion 104, and a bending transition portion 106 that is disposed between the extension portion 102 and the hand grip portion 104. Similarly, the second aerobar includes a first or proximal end 110, a second or distal end 112, an extension portion 114, a hand grip portion 116 and a bending transition portion 118 that is disposed between the extension portion 114 and hand grip portion 116.

The first ends 94 and 110 of the aerobar are sized and configured for being received within the aerobar clamp, as will be described in more detail below. The extension portions 102, 114, are generally linear, and extend forwardly, in a direction that may be co-linear with the travel axis T of the bicycle. However, as will be explained in more detail below, the extension portions need not be co-linear with travel axis T.

Generally, the purpose of the extension portions 102, 114 is to provide for a forward placement of the hand grip portions 104, 116, so that when the rider is riding in a crouch position, the hand grip portions 104, 116 will be placed in the proper position for the user.

The hand grip portions 104, 116 are sized, configured and positioned to be gripped by the hands of the user. The hand grip portions 104, 116 are placed at an angle by the respective bending portions 106, 118 to be ergonomically appropriate for the rider. As one can imagine, a completely linear aerobar would be uncomfortable for a rider due to the fact that 90 degrees is at or passed the limit of the range of motion of the wrist joint of the user.

As will be apparent from a review of other aerobar-related patents, and in view of the adjustability of the aerobar of the current inventions, it will be appreciated that different persons have different preferences relating to the position of the hand grip portions of the aerobar. These differences relate to almost every dimension, including the distance of the hand grip portions 114, 116 from the laterally extending portions of the handlebar, but also the angle of inclination of the aerobars, the particular orientation of the hand grip portions about an axis defined by the axis of the extension portion of the aerobar, and the inward or outward orientation of the aerobars about an imaginary vertical axis to the aerobars. To borrow phraseology from the aeronautical industry, differences in relative "pitch", "roll", and "yaw" orientations exist for different users, along with differences in the distance from the handlebar orientation among different users.

In one preferred embodiment, a plurality of collets of varying pitch will be offered to customers. For example, the collets could be offset with a one degree offset, two degree offset, three degree offset, etc.

The first 90 and second 92 aerobar receiving clamps 90, 92 preferably comprise first and second collet receivers 124, 125. The first and second collet receivers 124, 125 preferably comprise, interior, axially extending first and second receiving sleeves 124, 125 respectively, for receiving a collet, such as first and second collets 160, 162, respectively, that themselves include interior passageways for receiving the aerobars 102, 114. As receiving sleeves 124, 125 are generally identical for both aerobar clamps 90, 92, only the receiving sleeve 124 of the aerobar clamp 90 will be described, particularly with respect to FIG. 10, it being understood that receiving sleeve of aerobar clamp 92 is virtually identical.

The receiving sleeve 124 includes a proximal end 126 and an open distal end 128. The proximal end 126 includes a beveled radially extending end surface 130. A tapered axially extending surface 132 extends from the beveled end surface 130 to the distal end 128 of the receiving sleeve 124. The axially extending surface is tapered such that it is narrower, close to the proximal end 126 and wider, close to the distal end 128, such that diameter A, adjacent to the closed proximal end is smaller than diameter B, that is adjacent to the open distal end 128. The tapered axially extending surface 132 defines a frusto-conical interior passageway 134 as described above. The frusto-conical interior passageway 134 includes an axis E.

An axially extending passageway 138 extends from the base surface 130 in a generally proximal direction. A retaining screw 150 having a head 140 and shaft 142 is sized to be received by the passageway 138. Particularly, the shaft 142 includes exterior threads 146 that are received in internal threaded passageway 161 of the collet 160. In this manner, the collet 160 is retained in the receiving sleeve 124, and the retaining screw 150 can serve as an axial mover of the collet, as rotation of the screw 150 in the threaded passageway (see FIG. 11) moves the collet 160 in an axial direction as indicated by arrow E of FIG. 10. The retaining screw 150 further includes a passageway 144 for allowing a gear cable to extend therethrough.

The first collet 160 is provided for being received within the receiving sleeve 124 of the aerobar clamp 90 and a second collet 162 is designed for being received within the receiving sleeve 125 of the aerobar clamp 92. As collets 160, 162 are virtually identical, the same numbers will be used to designate identical parts in both collet 160, and collet 162. Each collet includes an end 167 having a central aperture 168. Central aperture 168 opens into the threaded central screw-receiving passageway 161, and extends through a frusto-conical base portion 169. The threaded passageway 161 is sized and configured to receive the threads of the screw 150.

The collets each include a frusto-conical outer surface 174 that includes a plurality of spaced axially extending slots (here shown as four slots) 176, for dividing the shaft receiving portion 172 of the collet into a plurality of segments. The axially extending slots 176 thereby define segments that permit the diameter of the shaft receiving portion 172 of the collets 160, 162 to be expanded.

As will be described in more detail later, the exterior diameter of an aerobar may be slightly larger than the interior diameter of a collet. As such, when the proximal end of an aerobar is inserted into the interior passageway, the segment 174 may "flower pedal" outwardly a little bit to thereby increase the effective diameter of the collet. This ability of the segment to allow such radial expansion makes it easier to insert the aerobar within the cylindrical inner space that is defined by the cylindrical inner wall of the collets. However, as the collet 160 is moved in a proximal direction within the interior 134 of the receiving sleeve 124, the radial pressure exerted by the interior wall 132 on the exterior surface wall 174 of the collet, reduces the radial diameter of the interior passageway 157, thereby causing the collet 160, 162 to be radially compressed, to thereby exert a compressive, gripping force against the exterior surface of the aerobar inserted therein. Because of the tapered nature of the interior wall 132, and the exterior wall 174, this dual compression, and thereby the pressure exerted against the aerobar will increase as the collet increasingly moves in a proximal direction within the interior 134 of receiving sleeve 124. This proximal direction is indicated by arrow F in FIG. 10.

It is important to note that although the exterior wall 174 of the collet is somewhat frusto-conical in nature, or at least has an effectively frusto-conical shape due to the increased diameter of the enlarged diameter end portion 164, the interior passageway 157 and interior wall 165 of the collet is cylindrical in configuration for receiving the generally cylindrical surface of the aerobar. Although a "cylindrical" configuration is not that important, it is important to note that the interior wall 165 (FIG. 22) should have a constant diameter and constant cross section shape throughout its length, or to such point as where the constant diameter portion joins with the base portion.

It will be noted that the axis 0 of the overall collet is offset from an axis S of the cylindrical passageway 157 of the sleeve into which the aerobar fits. In FIG. 22, the distal end portion 179 of the collet 160 is shown. When the collet 160 is viewed from its distal end portion 179, it will be noted that the thickness of the end wall at the distal end varies about the circumference. For example, at the point equivalent to 12:00 (1200 in FIG. 22), the wall is somewhat thinner. At the 3:00 (300 in FIG. 22) and 9:00 (900 in FIG. 22) positions, the wall 184 is thicker. The wall reaches its thickest at 6:00 (600 in FIG. 22), which is disposed 180 degrees from 12:00. This thickness in the wall reflects the offset between the axis of the overall collet 162, the axis of the cylindrical passageway 168. The reader's attention is also directed to FIG. 22, where it is shown that at the thickness of the collet 160 at the 6:00 position 600 varies linearly between the proximal and distal ends of the collet 160.

It has been found by the Applicant that the angular offset between the two axes S, O should be somewhere between about 0.1 and 5 degrees, and preferably somewhere about 1.0 and 3 degrees. This axial offset will cause an aerobar that is inserted within the collet 160 to be positioned along an axis S that is co-linear with the interior passageway 157 of the collet, rather than being positioned at axis O, which is the axis of the entire collet 160, and which, is co-linear with the axis of the receiving sleeve.

The axial offset between the axis S of the interior passageway 157 and interior wall 165 of the collet 160, and hence the axis of the aerobar 14, 16; and the axis 0 of the overall collet 162 and the receiving sleeve 92 axis, causes the aerobars to extend from the receiving sleeve along the axis S of the interior of the collet.

It should also be noted that the rotational position of the collets (when rotated about their axes) can be varied by the user. By varying the rotational position of the collet, the user can effect different axial orientations of the aerobars 14, 16. As each collet has at least 360 degrees of potential rotation within the receiving sleeve 90, 92, the axis of the aerobars can also be varied, at least 360 degrees.

Examples of how such adjustments can be made are best shown in FIGS. 7 through 9 and, in particular, to FIGS. 8 and 9 which are sectional views taken along lines 8-8 and 9-9 respectively of FIG. 7. Turning now to FIG. 8, it will be noted by the thickened portion of collet 160 is disposed at approximately a 9:00 position. By so doing, this causes the aerobar 14 to be oriented inwardly. By contrast, collet 162 (FIG. 9) has the thicker portion of the collet 162 oriented at the 3:00 position. By so doing, it also causes the aerobar 16 to be oriented inwardly. In FIG. 22, the thickened portion of the collet 160 is located at the 6:00 position 600.

In one form, the handlebar includes a collet receiver for disposing the collet along a first axis, and wherein the collet is capable of receiving an aerobar such that the aerobar is disposed along a second axis offset from the first axis.

It should be noted that a first forearm rest member 200 can be attached to the handlebar 12 through a pair of screws 202 that extend through the first forearm rest member 200 and received within threaded blind apertures that are disposed on a raised armrest surface 204. The armrest surface 204 is disposed on the upper surface of the laterally extending portion 34. A pad 220 (see FIG. 1) is preferably disposed on the forearm rest member 200. A second forearm rest member 219 can also be attached to the handlebar 12 through a pair of screws 212 that extend through the second forearm rest member and received with threaded blind apertures that are disposed on a raised armrest surface 214. The armrest surface 214 is disposed on the upper surface of the laterally extending portion 36. A pad 222 (see FIG. 1) is preferably disposed on the forearm rest member.

Figure 2:
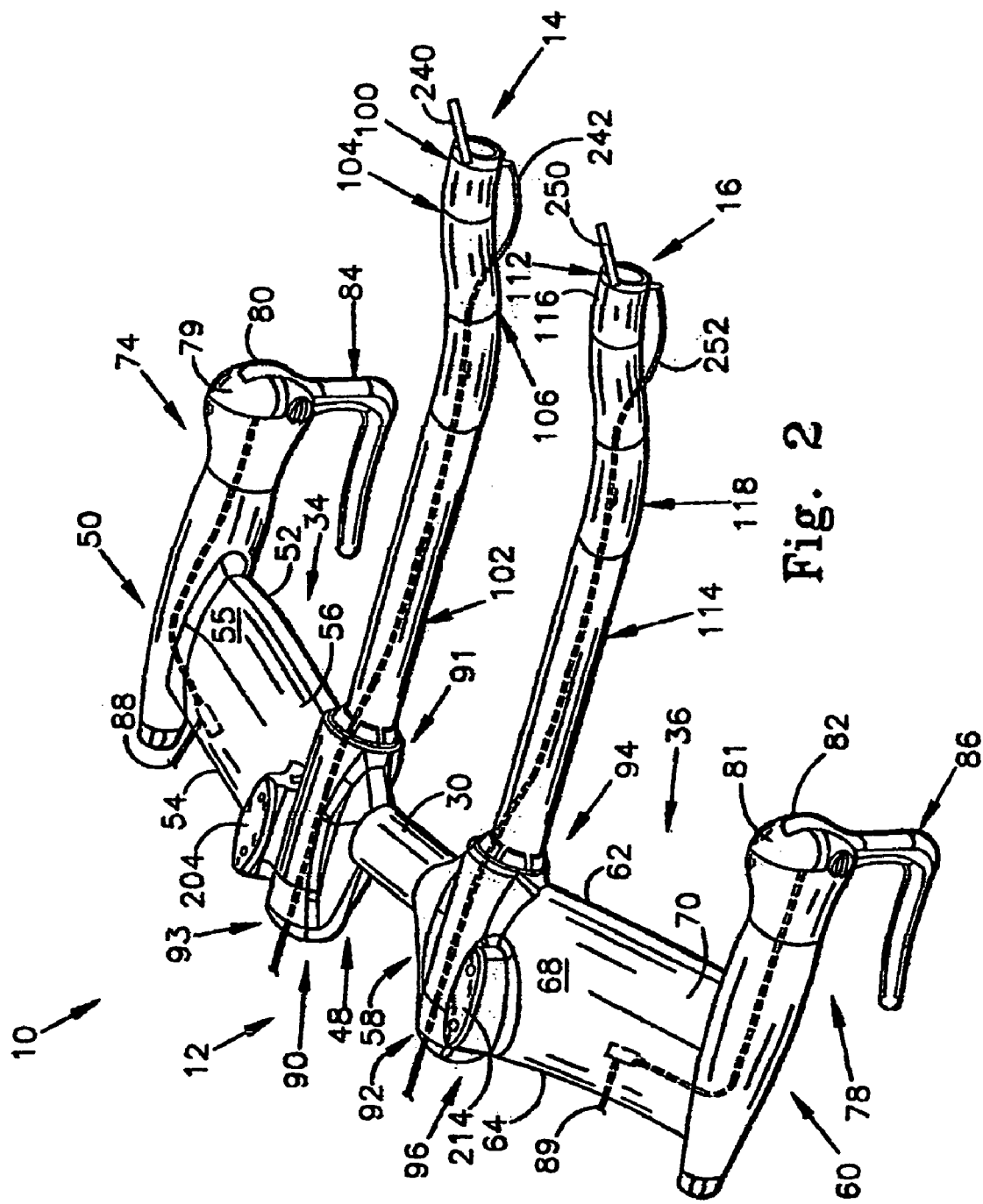
FIG. 2 is a perspective view of the handlebar of FIG. 1 with forearm rest members removed.

Referring to FIGS. 1 and 2, a gear shift lever 240 is shown disposed on the end 100 of aerobar 14, while a gear shift lever 250 is shown disposed on end 112 of aerobar 16. A gear shift cable 242 is operatively coupled to the gearshift lever 240 and extends through the aerobar 14 and out of the rear of the aerobar receiving clamp 90 (through screw 150). Likewise, the gear shift cable 252 is operatively coupled to the gearshift lever 250 and extends through the aerobar 16 and out of the rear of the aerobar receiving clamp 92. As is typical in bicycles, one gear shift lever 240 controls the operation of the rear-wheel mounted cassette, (not shown) whereas the other gear shift lever 250 controls the movement of the chain among the sprockets of the crankset (not shown). Examples of such cassettes and cranksets are well known in the art, and available from a variety of companies, such as Shimano, Sram & Campagnolo Alternate embodiment collets 601, 700 are shown in FIGS. 20 and 21, with FIG. 20 showing an eccentric collet 601, and FIG. 21 showing a co-linear collet 700.

Eccentric collet 601 is generally similar to collets 160, 162, and differs primarily in respect to the orientation of the axis of the inner surface 608 relative to the axis of the outer surface 606. Excentric collet 601 includes a proximal end 602, that, in practice is located closer to the rear of the bicycle, and a distal end 604 that, in practice, is closer to the forward end of the bicycle. The collet includes a cylindrical outer surface 606, that is sized and configured for being received within the tapered receiving sleeve of the handlebar, and a cylindrical inner surface 608, that is sized, configured and received for receiving the proximal end of an aerobar. In FIG. 20, it will be noted that the portion of the collet wall 614 disposed at the 6:00 portion of the collet is significantly thicker than the portion of the collet wall 618, disposed at the 12:00 portion 1200 of the collet. It will also be noticed that the 6:00 portion 614 has a uniform thickness along its entire length, from the proximal to distal ends.

This configuration results in the overall axis of the collet EO being generally parallel to the axis ES of the inner wall 608 of the collet 601. As such, the axis of an aerobar that is inserted into the distal end 604 of collet 601 will have an axis that is generally parallel to the overall axis EO of the collet. However, the axis ES of the aerobar will be parallel to, but offset from the axis EO of the overall collet 601. As discussed above in connection with collet 162, collet 601 can be rotated about axis EO within the receiving sleeve of the handlebar. Because of the eccentric nature of collet 601, the rotation of collet 601 within the handlebar will cause the axis of the aerobar to scribe a circle, during rotation, that has its center point at the overall axis EO of the collet, and a radius equal to the distance between axes EO and ES.

A second embodiment collet 700 is shown in FIG. 21. Collet 700 is similar to collets 160 and 602, insofar as collet 700 includes a proximal end 702, a distal end 704, an outer surface 706, and an inner surface 708. Also similarly, inner surface 708 defines a sleeve for receiving the proximal end of an aerobar; and a series of parallel, blind slots 710 are provided for enabling the user to vary the radial diameter of the collet 700, in a manner similar to that described above in connection with collet 160.

In co-linear collet 700, the 6:00 portion 714 and 12:00 portion 706 have generally the same thickness throughout their entire length. Additionally, it will be noted that the interior surface 708, and exterior surface 706 are co-axial, such that both share a common axis CO, CS.

Because of this co-axial nature of the inner surface 706, 708, the rotation of co-linear collet 700 about its axis CO, CS, within the receiving sleeve of the handlebar, will not cause the axis of the aerobar necessarily to change position, as is the case with collets 162 and 601. As such, collet 700 does not have the adjustable angular and radial positionability features of collets 162, 601 respectively. However, because of the co-linear nature of the inner and outer surfaces 706, 708, collet 700 can be made to have much thinner walls, and a reduced diameter when compared to either collets 162 or 601. This permits the manufacturer, to make collet 700 to have a smaller diameter and thereby, if the manufacturer so desires, reduce the jet-engine shaped "bulge" in the wing-shaped handlebar caused by the collet receiving portion of the handlebar.

It is believed by the Applicants that some riders will prefer the relative thinness and reduced diameter of the collet 700 to the adjustability of the adjustable bi-axial collet 162, and eccentric collet 601.

A second embodiment of an aerobar clamp system is depicted in FIGS. 12-15. Particularly, FIGS. 12-15 shows a pair of aerobar clamp systems or assemblies 300, 302, for clamping aerobars 303, 305 onto a more traditional handlebar, such as rams horn-like drop handlebars 304. The aerobar clamp system may be considered a clip-on aerobar clamp system.

The two aerobar clamp systems 300, 302 are generally identical. As such, only clamp 300 will be described herein below, it being understood that clamp 302 is identical thereto.

Clamp system 300 includes a clamp 308 that is comprised of a first clamping member 310, that itself includes a frusto-spherical first clamp or clamp half 312 and an integral collet 314. A generally cylindrical collet 315 is also part of the clamp system 300. Another part of the clamp 308 is the frusto-spherical second clamp or clamp half 316, that can be coupled to the first clamp half 312 of the first clamping member 310. The first clamp half 312 includes a first axially extending threaded aperture 322, and a second axially extending threaded aperture 324. The longitudinal extent of the apertures 322, 324 is along a line that is generally co-linear with axis J. Actually, line J is also co-linear to the axis of the collet member 314 and the collar 315 along with being co-axial with the axis of the extension portion 382 of the aerobar 303.

Figure 12:
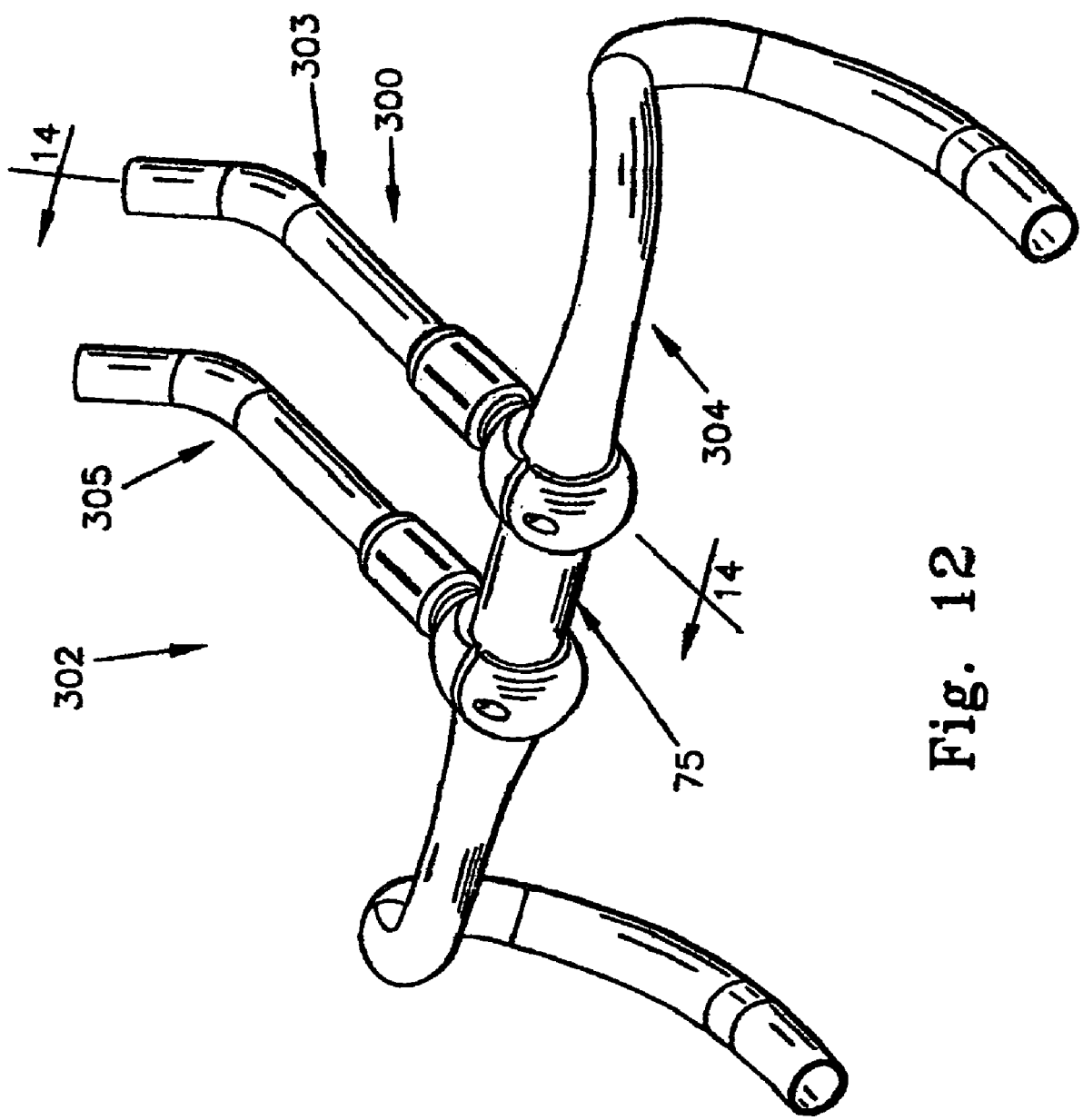
FIG. 12 is perspective view of a first alternative embodiment, showing a clip-on aerobar version of the present invention.
Figure 13:
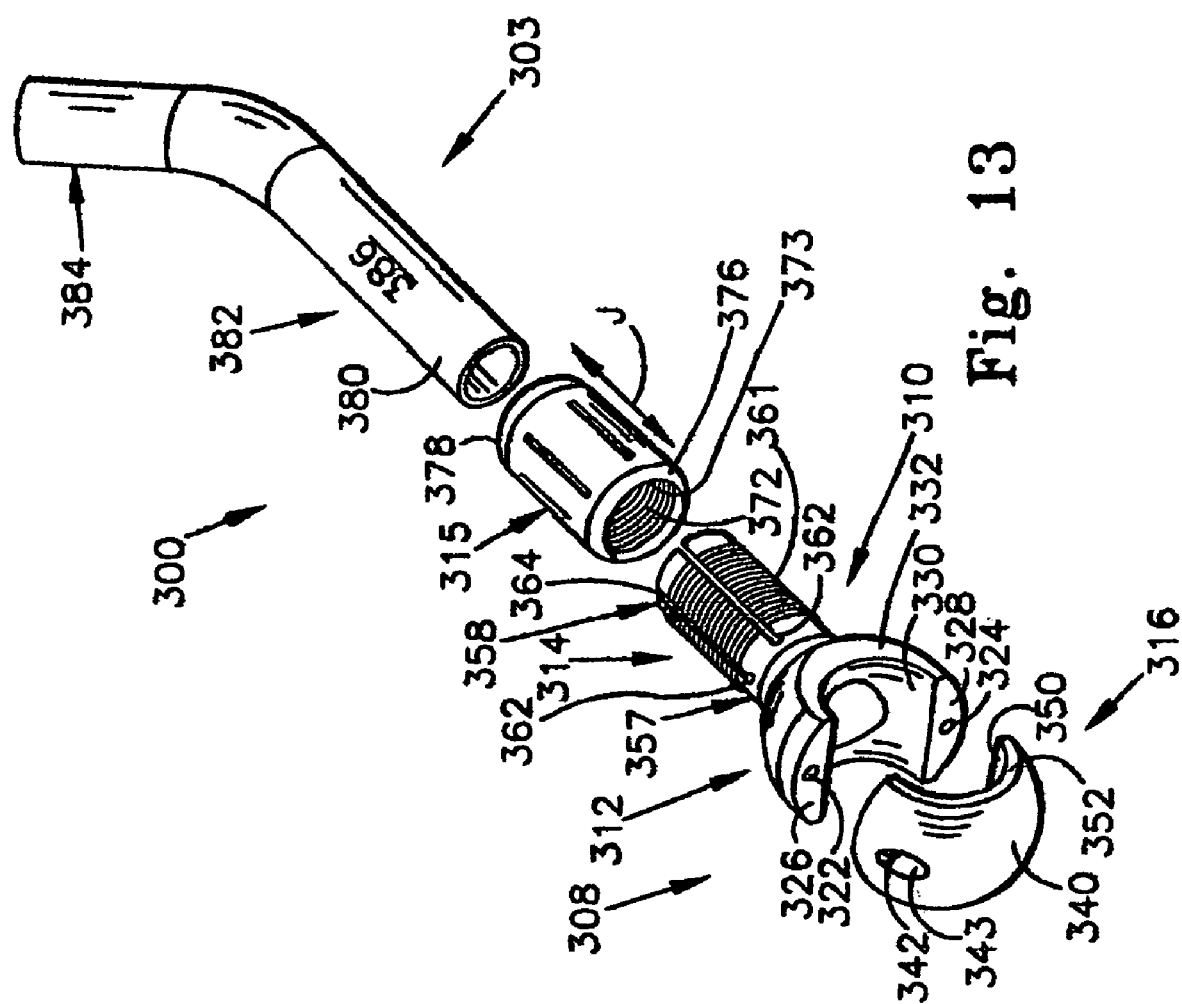
FIG. 13 is an exploded view of a clip-on aerobar assembly of the clip-on aerobar of FIG. 12.

The first clamp half 312 also includes a radially extending first mating face 326, and a second radially extending mating face 328. A hemi-cylindrical handlebar receiving surface 330 is generally concave in nature, and is designed for snugly receiving a handlebar (e.g. handlebar 304 as illustrated in FIG. 12) so that the aerobar clamps 300, 302 can be fixedly, but removably coupled to the handlebar 304. The particular embodiment of a first clamp half 312 of the present invention is also shown to include a pair of planar side surfaces, 332.

The second clamp half 316 includes a frusto-spherical outer surface 340, having a first aperture 342, that is counter sunk into a recess 343. A second, like aperture 344 is also provided that is disposed on another side of the second clamp half 316. The first and second aperture 342, 344 of the second clamp half 316 are sized, configured and positioned to be aligned with the first and second apertures 322, 324 of the first clamp member 310, so that when the clamp members are placed together, such as is shown in FIGS. 14 and 15, a first joinder screw 354 can extend through the first aperture 342, 322; and a second joinder screw 356 can extend through the second joinder apertures 344, 324. Through the action of a joinder screw within these apertures, the first and second clamp halves 310, 316 can be joined together to snugly engage the handlebar 304, such as shown in FIG. 12, to fixedly position the clamp 308 and thus the clamp system 300 onto the handlebar 304.

The second clamp half 316 also includes a first and second mating faces 346, 348 that are sized, positioned and configured to mate with mating faces 326, 328 respectively, a hemi-cylindrical handlebar receiving surface 350, and a pair of planar side surfaces 352. The planar side surfaces should be designed to mate with the planar side surfaces 332 of the first clamp half, to form a pleasing aesthetic device.

The integral collet 314 includes a first proximal end 357, a second or distal end 358, and a smooth, generally cylindrical interior surface that is sized and configured for receiving the proximal end 380 of the aerobar 303 therein. The collet 314 also includes a threaded outer surface 361, and a plurality of spaced, axially extending slots 362, with each slot 362 having an open end 364 adjacent to the distal end 358 of the collet 314. While not necessarily so, the integral collet 314 preferably operates similarly to the collets 160, 162 shown in connection with the first embodiment, and can be configured similarly to any of collets 160, 601, or 700.

The generally cylindrical collar 315 is sized and configured to interiorly receive the collet 314. The collar 315 includes a generally cylindrical, threaded inner surface 372 that defines an axially extending passageway 373 for receiving the exterior surface of the collet 314. The threads 361 of the collet engage the interior threads 372 of the collar 315, to enable the collar 315 to move axially proximally on the collar 314 through rotation. The collar 315 also includes a proximal end 376 and a distal end 378.

In order to operate the clamp on aerobar system of the present invention, the two collar halves 310, 316 are fitted around a handlebar 304 at an appropriate position. A joinder screw is then inserted through the appropriate aperture 342, 326; and 322, 324, to join the two clamp halves to snugly grab and engage the handlebar 304.

The proximal end 380 of the extension portion 382 of aerobar 303 is then inserted into the interior passageway of the collet 314. The aerobar 303 is rotated about the axis of the extension 382 to orient the hand grip portion 384 in a proper orientation. Prior to the aerobar being inserted into the interior of the collet 314, the collar 315 is slipped over the proximal end 380 of the aerobar and pushed axially outwardly out of the way, to not impede the insertion of the proximal end 380 of the aerobar 303 into the interior passageway of the collet.

After the aerobar 303 is rotated to its proper orientation, the collar 315 is then moved axially along the extension portion 382 of the aerobar toward the collet 314 and the collar 315 is then rotated upon engagement with the collet 314. Rotation of collar 315 causes the interior threads 372 of the collar to engage the exterior threads 361 of the collet 314. By continued rotation of the collar, the collar moves axially and proximally on the collet 314 in a direction toward the clamp halves 310, 316.

Along with this axial movement, the engagement of the collar 315 with the collet reduces the radial extent of the gaps of the slots 362 to thereby help to radially press the collet into engagement with the outer surface 386 of the aerobar. Continued rotation of the collar 315 onto the collet 314, increases the clamping (radial) force of the collet 314 onto the aerobar 303, to thereby more tightly and more securely fix the position of the aerobar 303 onto the clamp member 308. When so fixedly positioned, both the axial position of the aerobar 303 and its relative rotational position should be fixed. It will be appreciated, that by moving the aerobar in an axial direction, prior to its tight engagement by the clamp member 308, the user can vary the axial position of the aerobar 303 to a position wherein it is most comfortable to her. Similarly, by rotating the aerobar 303 about the axis 386 of the extension portion 382, the user can orient the handgrip portion 384 in a position that is comfortable to her. By holding the aerobar in this desired position, the collar is then engaged to the collet, so that when fully and securely engaged, the axial and rotational position of the aerobar that the user desires is maintained during use.

Figures 16, 17, 18:
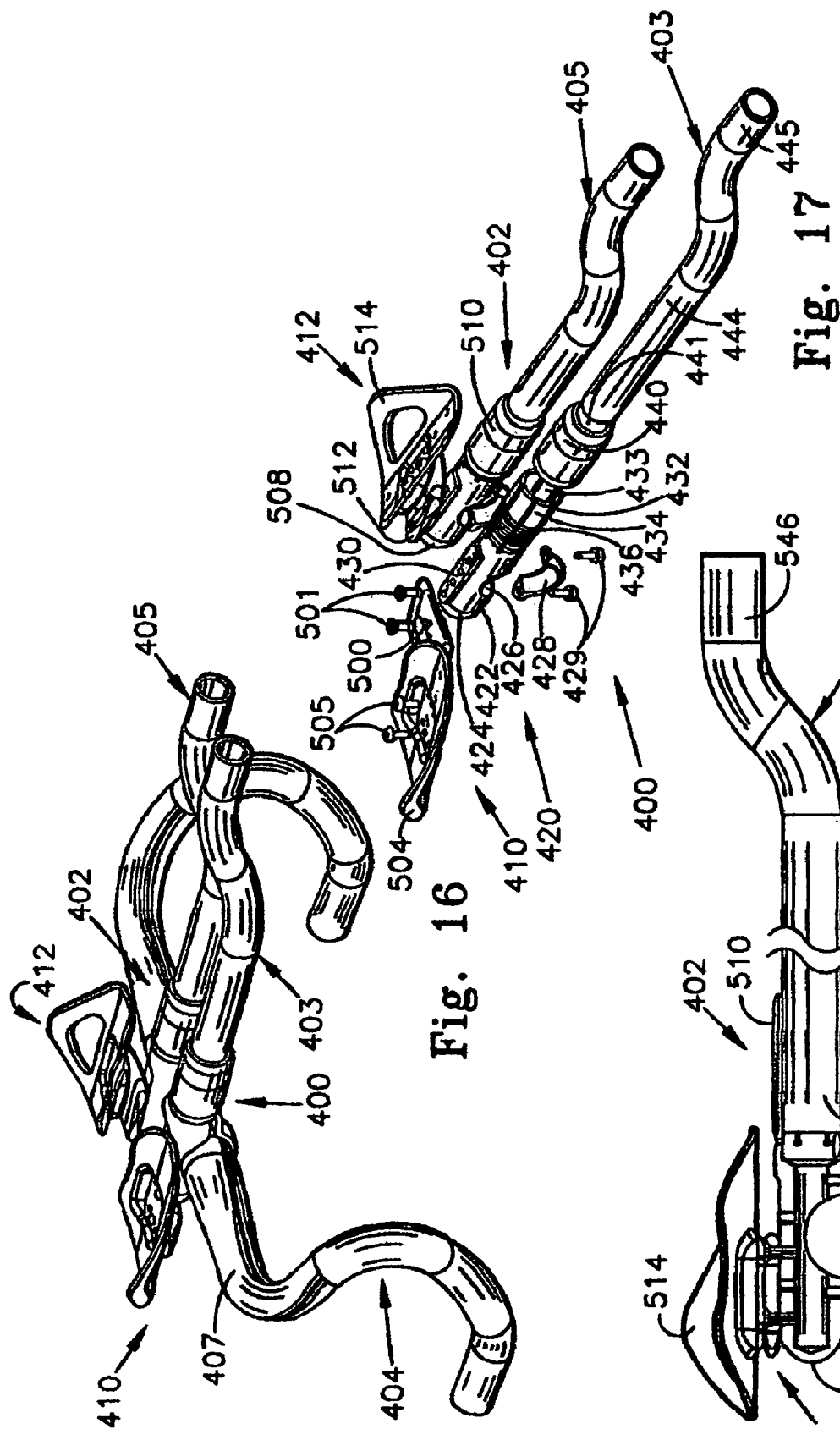
FIG. 16 is a perspective view of a second alternative embodiment, showing a second clip-on aerobar version of the present invention.
FIG. 17 is a perspective view of the clip-on aerobar assemblies of the aerobar version of FIG. 16 with an aerobar clamping mechanism illustrated as exploded.
FIG. 18 is a side view of the clip-on aerobar version of FIG. 16 with the aerobar clamping mechanism shown in section.

A third embodiment of an aerobar clamp system is depicted in FIGS. 16-19. FIG. 16 shows a pair of aerobar clamp systems or assemblies 400, 402, mounted onto handlebars 404 for attaching aerobars 403, 405 to the handlebar 404. Forearm rest assemblies 410, 412 may be provided and mounted to respective aerobar clamp systems 400, 402. The two aerobar clamp systems 400, 402 are generally identical. As such, features discussed with respect to one aerobar clamp system are applicable to the other aerobar clamp system. Moreover, the two forearm rest assemblies 410 and 412 are generally identical. As such, features discussed with respect to one forearm rest assembly are applicable to the other forearm rest assembly.

As shown in FIG. 17, aerobar clamp system 400 includes an attachment member 420 that is comprised of a generally tubular body 422. The tubular body 422 is adapted to be received and attached onto the handlebar 404. To this end, a proximate end 424 of the tubular body 422 includes a curved notch 426 configured essentially complementarily to the outside surface of the handlebar 404. A bracket 428 is mounted around the handlebar 404 and into screw reception bores in the body 422. As the bracket 428 is tightened to the body 422 via screws 429 for releasable fixation to the handlebar 404, the body 422 may be positioned in various angular orientations perpendicular about a longitudinal axis of the handlebar portion 407 to which the aerobar clamp system 400 is mounted, for allowing the aerobar 405 to be positioned in various angular orientations.

The body 422 defines an integral collet 432 of a generally tubular shape that is sized and configured for receiving the proximal end 444 of the aerobar 403 therein. The collet 432 includes a plurality of spaced, axially extending slots 434, with each slot 434 having an open end adjacent to the distal end of the collet 432. The collet 432 also includes a threaded outer surface 436 for threaded engagement with internal threads of a collar 440 of the aerobar clamp system 400. While not necessarily so, the integral collet 432 preferably operates similarly to the collets shown and described in connection with the previous embodiments.

The collar 440 has an opening 441 that is sized and configured to receive the proximate end 444 of the aerobar 403 and an internal, axially extending tubular passageway that is sized and configured to be received over the collet 432 and onto the threaded portion 436. The interior threads of the collar 440 cooperate with the outer threads 436 of the collet 432 to enable the collar 440 to move axially and proximally on the collet 432 through rotation. The collar 315 also includes a proximal end 376 and a distal end 378.

The proximal end 444 of the aerobar 403 is then inserted into the interior passageway of the collet 432 of the attachment member 420. The aerobar 403 is rotated about the axis of the extension collet 432 to orient the hand grip portion 445 of the aerobar 403 in a proper orientation. Prior to the aerobar being inserted into the interior of the collet 432, the collar 440 is slipped over the proximal end 440 of the aerobar 403 and pushed axially outwardly out of the way, to not impede the insertion of the proximal end 444 of the aerobar 403 into the interior passageway 443 of the collet 432.

After the aerobar 403 is rotated to its proper orientation, the collar 440 is then moved axially toward the collet 432. The collar 440 is then rotated upon engagement with the collet threads 436. Rotation of collar 440 causes the interior threads of the collar to engage the exterior threads 436 of the collet 432. By continued rotation of the collar, the collar moves axially and proximally on the collet 432.

Along with this axial movement, the engagement of the collar 440 with the collet 432 reduces the radial extent of the gaps of the slots 434 to thereby help to radially press the collet 432 into engagement with the outer surface of the aerobar 403. Continued rotation of the collar 440 onto the collet 432, increases the clamping (radial) force of the collet 432 onto the aerobar 403, to thereby more tightly and more securely fix the position of the aerobar 403 relative to the clamp system 400. In so fixedly positioned, both the axial position of the aerobar 403 and its relative rotational position should be fixed. It will be appreciated, that by moving the aerobar 403 in an axial direction prior to its tight engagement by the clamp system 400, the user can vary the axial position of the aerobar 403 to a position wherein it is most comfortable to him. Similarly, by rotating the aerobar 403 about an axis of the portion 407 of the handlebar 404, the user can orient the handgrip portion 445 in a position that is comfortable to him. By holding the aerobar in this desired position, the collar is then engaged to the collet, so that when fully and securely engaged, the axial and rotational position of the aerobar that the user desires is maintained during use.

The forearm rest assembly 410 includes a mounting plate 500 that is adapted for attachment to the attachment member 420. Particularly, the mounting plate 500 is attached to an armrest reception area 430 of the body 422 of the attachment member 420. The armrest reception area 430 includes four screw reception bores two of which are configured to receive mounting screws 501 for attaching the mounting plate 500 to the mounting plate 500. A contoured armrest 504 is situated onto and over the mounting plate 500 and attached to the mounting plate 500 via mounting screws 505. An armrest pad or cushion (not shown) is preferably, but not necessarily, provided on the contoured armrest 504. The contoured armrest 504 may be adjustable relative to the attachment member 420.

Referring additionally to FIG. 18, the aerobar clamp system 402 includes an attachment member 508 that is identical to the attachment member 420 of clamp system 400 and a collar 510 that is identical to the collar 440 of the clamp system 400. The aerobar clamp system 402 is thus adapted in like manner to the aerobar clamp system 402, to adjustably retain an aerobar (405) relative to the handlebar 404. An armrest assembly 412 is preferably but not necessarily, associated with the aerobar clamp system 402.

Figure 19:
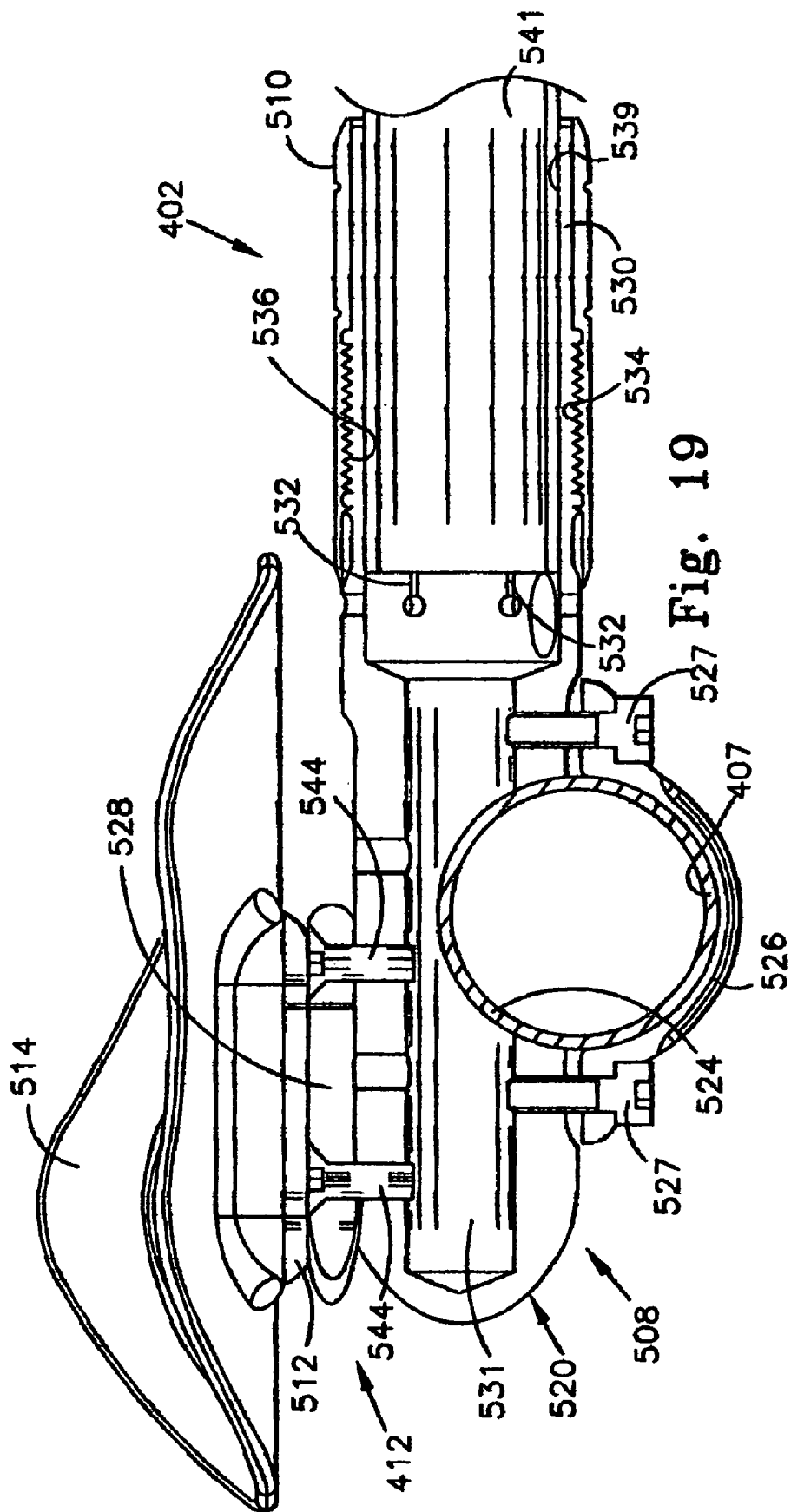
FIG. 19 is an enlarged side view of the sectioned aerobar clamping mechanism of FIG. 18.

As best seen in FIG. 19, the clamp system 402 includes the attachment member 508 that is comprised of a generally tubular body 520. The tubular body 520 is adapted to be received and attached onto the handlebar 404 such as handlebar portion 407. To this end, a proximate end 522 of the tubular body 520 includes a curved notch 524 configured essentially complementarily to the outside surface of the handlebar portion 407. A bracket 526 is mounted around the handlebar portion 407 and into screw reception bores in the body 520. As the bracket 526 is tightened to the body 520 via screws 527, the body 520 may be positioned in various angular orientations perpendicular to a longitudinal axis of the handlebar portion 407 to which the aerobar clamp system 400 is mounted. This allows for the aerobar 405 to assume various angular orientations about the handlebar portion 407.

The body 520 defines an integral collet 530 of a generally tubular shape that is sized and configured for receiving the proximal end 541 of the aerobar 405 therein. The collet 530 includes a plurality of spaced, axially extending slots 532, with each slot 532 having an open end adjacent to the distal end of the collet 530. The collet 530 also includes a threaded outer surface 534 for threaded engagement with internal threads 536 of the collar 510 of the aerobar clamp system 402. While not necessarily so, the integral collet 530 preferably operates similarly to the collets shown and described in connection with the previous embodiments.

The collar 510 has an opening that is sized and configured to receive the proximate end 541 of the aerobar 405 and an internal, axially extending tubular passageway that is sized and configured to be received over the collet 530 and onto the threaded portion 534. The interior threads 536 of the collar 510 cooperate with the outer threads 534 of the collet 510 to enable the collar 510 to move axially and proximally on the collet 530 through rotation.

The proximal end 541 of the aerobar 405 is then inserted into the interior passageway 531 of the collet 530 of the attachment member 508. The aerobar 405 is rotated about the axis of the extension collet 530 to orient the hand grip portion 546 (see FIG. 18) of the aerobar 405 in a proper orientation. Prior to the aerobar being inserted into the interior of the collet 530, the collar 510 is slipped over the proximal end of the aerobar 405 and pushed axially outwardly out of the way, to not impede the insertion of the proximal end 541 of the aerobar 405 into the interior passageway 541 of the collet 530.

After the aerobar 405 is rotated to its proper orientation, the collar 510 is then moved axially toward the collet 530. The collar 510 is then rotated upon engagement with the collet threads 536. Rotation of collar 510 causes the interior threads 534 of the collar 510 to engage the exterior threads 536 of the collet 530. By continued rotation of the collar, the collar 510 moves axially and proximally on the collet.

Along with this axial movement, the engagement of the collar 510 with the collet 530 reduces the radial extent of the gaps of the slots 532 to thereby help to radially press the collet 530 into engagement with the outer surface of the aerobar 405. Continued rotation of the collar 510 onto the collet 530, increases the clamping (radial) force of the collet 530 onto the aerobar 405, to thereby more tightly and more securely fix the position of the aerobar 405 relative to the clamp system 402. In so being fixedly positioned, both the axial position of the aerobar 405 and its relative rotational position should be fixed. It will be appreciated, that by moving the aerobar 405 in an axial direction prior to its tight engagement by the clamp system 402, the user can vary the axial position of the aerobar 405 to a position wherein it is most comfortable to him. Similarly, by rotating the aerobar 405 about an axis of the portion 407 of the handlebar 404, the user can orient the handgrip portion 546 of the aerobar 405 in a position that is comfortable to him. By holding the aerobar in this desired position, the collar is then engaged to the collet, so that when fully and securely engaged, the axial and rotational position of the aerobar that the user desires is maintained during use.

The forearm rest assembly 412 includes a mounting plate 512 that is adapted for attachment to the attachment member 508. Particularly, the mounting plate 512 is attached to an armrest reception area 528 of the body 520 of the attachment member 508. The armrest reception area 528 includes screw reception bores two of which are configured to receive mounting screws 544 for attaching the mounting plate 512 to the mounting area 528. A contoured armrest 514 is situated onto and over the mounting plate 512 and attached to the mounting plate 512 via mounting screws. An armrest pad or cushion (not shown) is preferably, but not necessarily, provided on the contoured armrest 514. The contoured armrest 514 may be adjustable relative to the attachment member 508.

While the invention has been illustrated and described in detail in the drawings and foregoing description, the same is to be considered as illustrative and not restrictive in character, it being understood that only a preferred embodiment has been shown and described and that all changes and modifications that come within the spirit of the invention are desired to be protected.

What is claimed is:

1. A handlebar for a bicycle comprising:
   a center portion adapted for reception on the bicycle;
   a first portion laterally extending from one side of the center portion;
   a second portion laterally extending from another side of the center portion;
   a first aerobar clamp disposed on the first portion, the first aerobar clamp having a first tapered receiving sleeve having an axis that is generally parallel to a travel axis of the handlebar, and a first collet having a major axis that extends in a plane generally parallel to the travel axis and receivable in the first tapered receiving sleeve, the first collet having a first aerobar receiving passageway and a plurality of first axially extending slots that permits the diameter of the first collet to be varied, and a first axial mover for axially moving the first collet, wherein axial movement of the first collet in the first tapered receiving sleeve reduces the diameter of the first collet whereby a first aerobar, when received in the first aerobar receiving passageway is retained by the first aerobar clamp, and extends forwardly of the aerobar clamp,
   wherein the first collet includes a proximal end having an axially extending surface defining an axially extending passageway, the first axial mover having a shaft interiorly insertable into the passageway and engageable with the axially extending surface for engaging the proximal end of the first collet for axially moving the first collet.

2. The handlebar of claim 1, wherein the aerobar is formed of a rigid material.

3. The handlebar of claim 1 wherein the first collect includes an outer surface having an outer surface axis, and an inner surface having an inner surface axis collinear with the outer surface axis.

4. The handlebar of claim 1, further comprising a second aerobar clamp disposed on the second portion, the second aerobar clamp having a second tapered receiving sleeve having an axis that is generally parallel to the travel axis of the handlebar, and a second collet having a major axis that extends in a plane generally parallel to the travel axis and receivable in the second tapered receiving sleeve, the second collet having a second aerobar receiving passageway and a plurality of second axially extending slots that permits the diameter of the second collet to be varied, and a second axial mover for axially moving the second collet, wherein axial movement of the second collet in the second tapered receiving sleeve reduces the diameter of the second collet whereby a second aerobar when received in the second aerobar receiving passageway is retained by the second aerobar clamp, wherein the second collet includes a proximal end having an axially extending surface defining an axially extending passageway, the second axial mover having a shaft interiorly insertable into the passageway and engageable with the axially extending surface for engaging the proximal end of the second collet for axially moving the second collet.

5. The handlebar of claim 4, wherein the first aerobar clamp is configured to allow a first cable to extend therethrough and out a rear portion thereof, and the second aerobar clamp is configured to allow a second cable to extend therethrough and out a rear portion thereof.

6. The handlebar of claim 5 wherein the first axial mover is coupled to, and is disposed collinearly with the first collet, and wherein the first axial mover includes a central passageway through which the first cable can pass to enable the first cable to extend within an interior of the first collet, the second axial mover coupled to, and disposed collinearly with the second collet, the second axial mover including a central passageway through which the second cable can pass to enable the second cable to extend within an interior of the second collet.

7. The handlebar of claim 1 wherein the axial movement of the first collet in the first receiving sleeve varies the radially directed clamping force on the first aerobar, and the first collet is fixedly axially positionable within the first tapered receiving sleeve at one of a variety of axial positions to maintain selected radially directed clamping force on the first aerobar to retain the first aerobar in the first aerobar clamp.

8. The handlebar of claim 7 wherein the axial mover comprises a retainer threadedly engageable with the first collect for effecting axial movement of the first collet.

9. A handlebar for a bicycle comprising:
a center portion adapted for coupling to the bicycle;
a first portion laterally extending from one side of the center portion;
a second portion laterally extending from another side of the center portion;
a first aerobar clamp disposed on the first portion, the first aerobar clamp having
a first collet and a first collet receiver for disposing the first collet along a first axis, the first collet capable of receiving a first aerobar such that the first aerobar is disposed along a second axis offset from the first axis; and
a second aerobar clamp disposed on the second portion, the second aerobar clamp having a second collet and a second collet receiver for disposing the second collet along a third axis, the second collet capable of receiving a second aerobar such that the second aerobar is disposed along a fourth axis offset from the third axis,
wherein the first and second collets include an axial mover for axially moving the respective first and second collets, which axial movement results in a change of pressure exerted upon the respective first and second aerobars by the respective first and second aerobar clamps.

10. The handlebar of claim 9 wherein the first and second collets includes a proximal end having an axially extending surface defining an axially extending passageway, the axial mover having a shaft interiorly insertable into the passageway and engageable with the axially extending surface for engaging the proximal end for axially moving the respective first and second collets.

11. The handlebar of claim 9, wherein the first aerobar clamp is configured to allow a first gear cable to extend therethrough and out a rear portion thereof, and the second aerobar clamp is configured to allow a second gear cable to extend therethrough and out a rear portion thereof.

12. The handlebar of claim 11 wherein the axial mover is coupled to, and is disposed collinearly with the respective first and second collets, and wherein the axial mover includes a central passageway through which the respective first and second gear cables pass to enable the cables to extend within an interior of the respective first and second collets.

13. A handlebar for a bicycle comprising:
a center portion adapted for coupling to the bicycle;
a first portion laterally extending from one side of the center portion;
a second portion laterally extending from another side of the center portion;
a first aerobar clamp disposed on the first portion, the first aerobar clamp having a first collet, an axial mover, a tapered receiving sleeve and a first collet receiver for disposing the first collet along a first axis, the first collet capable of receiving a first aerobar such that the first aerobar is disposed along a second axis offset from the first axis; and
a second aerobar clamp disposed on the second portion, the second aerobar clamp having a second collect, an axial mover, a tapered receiving sleeve and a second collet receiver for disposing the second collet along a third axis, the second collet capable of receiving a second aerobar such that the second aerobar is disposed along a fourth axis offset from the third axis
wherein the first collet includes an outer surface having an outer surface axis, and an inner surface having an inner surface axis, wherein the inner surface axis intersects the outer surface axis.

14. The handlebar of claim 13, wherein the inner surface axis intersects the outer surface axis at an angle of between about 0.1 and five degrees.

15. A handlebar for a bicycle comprising:
a center portion adapted for coupling to the bicycle;
a first portion laterally extending from one side of the center portion;
a second portion laterally extending from another side of the center portion;
a first aerobar clamp disposed on the first portion, the first aerobar clamp having a first collet, an axial mover, a tapered receiving sleeve and a first collet receiver for disposing the first collet along a first axis, the first collet capable of receiving a first aerobar such that the first aerobar is disposed along a second axis offset from the first axis; and
a second aerobar clamp disposed on the second portion, the second aerobar clamp having a second collet, an axial mover, a tapered receiving sleeve and a second collect receiver for disposing the second collet along a third axis, the second collet capable of receiving a second aerobar such that the second aerobar is disposed along a fourth axis offset from the third axis wherein the first collet includes an outer surface having an outer surface axis, and an inner surface having an inner surface axis, wherein the inner surface axis is parallel to and offset from the outer surface axis.

16. The handlebar of claim 15, wherein the first aerobar clamp is configured to allow a first gear cable to extend therethrough and out a rear portion thereof, and the second aerobar clamp is configured to allow a second gear cable to extend therethrough and out a rear portion thereof.

17. A handlebar for a bicycle comprising:

a center portion adapted for reception on the bicycle;

a first portion laterally extending from one side of the center portion;

a second portion laterally extending from another side of the center portion;

a first aerobar clamp disposed on the first portion, the first aerobar clamp having a first tapered receiving sleeve having an axis that is generally parallel to a travel axis of the handlebar, and a first collet having a major axis that extends in a plane generally parallel to the travel axis and receivable in the first tapered receiving sleeve, the first collet having a first aerobar receiving passageway and a plurality of first axially extending slots that permits the diameter of the first collet to be varied, wherein axial movement of the first collet in the first tapered receiving sleeve reduces the diameter of the first collet whereby a first aerobar received in the first aerobar receiving passageway is retained by the first aerobar clamp, wherein the first collet includes an outer surface having an outer surface axis and an inner surface having an inner surface axis not colinear with the outer surface axis, and wherein the first collet is rotatable within the first tapered receiving sleeve for permitting a user to vary the axis of the first aerobar received within the first collet.

18. The handlebar of claim 17, wherein the inner surface axis intersects the outer surface axis, such that rotation of the first collet within the first tapered receiving sleeve permits the user to vary the angular position of the aerobar relative to the first tapered receiving sleeve axis.

19. The handlebar of claim 17, wherein the inner surface axis is parallel to the outer surface axis, and is offset from the outer surface axis by a predetermined distance, such that rotation of the first collet within the first tapered receiving sleeve causes the inner surface axis to scribe a circle having its center on the outside surface axis, and its radius equal to the predetermined distance.

20. A clamping system for clamping an aerobar to a bicycle handlebar, the clamping system comprising:

a first aerobar clamp having a first tapered receiving sleeve having an axis that is generally parallel to a travel axis of the handlebar, and a first collet having a major axis that extends in a plane generally parallel to the travel axis and receivable in the first tapered receiving sleeve, the first aerobar clamp having a first collet disposed in the receiving sleeve along a first axis, the first collet capable of receiving a first aerobar such that the first aerobar is disposed along a second axis offset from the first axis; and the first collet having a first aerobar receiving passageway and a plurality of first axially extending slots that permit the diameter of the first collet to be varied, and an axial mover for axially moving the first collet, wherein axial movement of the first collet in the first tapered receiving sleeve by the axial mover reduces the diameter of the first collet whereby a first aerobar received in the first aerobar receiving passageway is retained by the first aerobar clamp.

21. The clamping system of claim 20 wherein the first collet includes a proximal end having an axially extending surface defining an axially extending passageway, the axial mover having a shaft interiorly insertable into the passageway and engageable with the axially extending surface for engaging the proximal end for axially moving the first collet.

22. The clamping system of claim 20 wherein the first aerobar clamp is configured to allow a first cable to extend therethrough and out a rear portion thereof.

23. The clamping system of claim 22 wherein the axial mover is coupled to, and is disposed collinearly with the first collet, and wherein the axial mover includes a central passageway through which the respective the first cable can pass to enable the cable to extend within an interior of the first collet.

\* \* \* \* \*